United States Patent
Kuroda

(10) Patent No.: US 8,533,378 B2
(45) Date of Patent: Sep. 10, 2013

(54) INFORMATION PROCESSING DEVICE, DATA TRANSFER CIRCUIT, AND CONTROL METHOD OF INFORMATION PROCESSING DEVICE

(75) Inventor: Yasuhiro Kuroda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 12/923,316

(22) Filed: Sep. 14, 2010

(65) Prior Publication Data

US 2011/0016259 A1 Jan. 20, 2011

Related U.S. Application Data

(63) Continuation of application No. PCT/JP2008/055294, filed on Mar. 21, 2008.

(51) Int. Cl.
*G06F 13/36* (2006.01)

(52) U.S. Cl.
USPC .......................................... 710/310; 710/316

(58) Field of Classification Search
USPC ................. 710/110, 120, 306, 310, 312, 316, 710/317, 200, 240, 243, 244
See application file for complete search history.

(56) References Cited

U.S. PATENT DOCUMENTS

| | | | |
|---|---|---|---|
| 5,418,937 A | | 5/1995 | Inoue |
| 6,032,205 A | * | 2/2000 | Ogimoto et al. ................ 710/33 |
| 6,378,029 B1 | * | 4/2002 | Venkitakrishnan et al. .. 710/317 |
| 6,633,946 B1 | * | 10/2003 | Hendel ........................... 710/317 |
| 7,051,150 B2 | * | 5/2006 | Naumann et al. ............. 710/317 |
| 7,274,690 B1 | * | 9/2007 | Park et al. ..................... 370/388 |
| 7,490,189 B2 | * | 2/2009 | Eberle et al. ................... 710/317 |
| 2002/0095550 A1 | | 7/2002 | Fujibayashi et al. |
| 2002/0099900 A1 | * | 7/2002 | Kawarai et al. ............... 710/317 |
| 2005/0005052 A1 | * | 1/2005 | Fernald et al. ................ 710/317 |
| 2007/0255886 A1 | * | 11/2007 | Dao et al. ...................... 710/317 |
| 2008/0310412 A1 | | 12/2008 | Wada et al. |

FOREIGN PATENT DOCUMENTS

| | | |
|---|---|---|
| JP | 3-250240 | 11/1991 |
| JP | 2000-267816 | 9/2000 |
| JP | 2001-16223 | 1/2001 |
| JP | 2002-169786 | 6/2002 |
| WO | 2007/097033 A1 | 8/2007 |

OTHER PUBLICATIONS

International Search Report for PCT/JP2008/055294, mailed May 13, 2008.

* cited by examiner

*Primary Examiner* — Khanh Dang
(74) *Attorney, Agent, or Firm* — Fujitsu Patent Center

(57) ABSTRACT

Cross bar control circuits are connected to each other by two buses, which are a broadcast bus for transmitting a broadcast packet from a system board to all system boards other than the system board and a point-to-point bus for transmitting a unicast packet from a system board to another system board. When unicast packets passing through the point-to-point bus are too many, the unicast packets are output by using the broadcast bus in addition to the point-to-point bus if the broadcast bus is not used. In this way, the unicast packets can be output quickly and efficiently, so that use efficiency of the broadcast bus and the point-to-point bus can be increased as a whole.

6 Claims, 16 Drawing Sheets

FIG.5

| ITEM | THRESHOLD VALUE |
|---|---|
| THE NUMBER OF ACCUMULATED PACKETS IN PP PACKET INPUT QUEUE 151a | $\alpha 1$ [PACKETS] |
| THE NUMBER OF ACCUMULATED PACKETS IN PP PACKET INPUT QUEUE 152a | $\alpha 2$ [PACKETS] |
| THE NUMBER OF ACCUMULATED PACKETS IN PP PACKET INPUT QUEUE 153a | $\alpha 3$ [PACKETS] |
| THE NUMBER OF ACCUMULATED PACKETS IN PP PACKET INPUT QUEUE 154a | $\alpha 4$ [PACKETS] |
| THE NUMBER OF ACCUMULATED PACKETS IN BC PACKET INPUT QUEUE 151b | $\beta 1$ [PACKETS] |
| THE NUMBER OF ACCUMULATED PACKETS IN BC PACKET INPUT QUEUE 152b | $\beta 2$ [PACKETS] |
| THE NUMBER OF ACCUMULATED PACKETS IN BC PACKET INPUT QUEUE 153b | $\beta 3$ [PACKETS] |
| THE NUMBER OF ACCUMULATED PACKETS IN BC PACKET INPUT QUEUE 154b | $\beta 4$ [PACKETS] |
| PP BUS USAGE RATE | $\gamma$ [%] |

FIG.6A

| bit0 | | 8 | 12 | 16 | 23 | 31 |
|---|---|---|---|---|---|---|
| OPCD | | SID | TID | PLNG | PID | |
| data0 ||||||||
| data1 ||||||||
| ⋮ ||||||||

FIG.6B

| bit0 | | 8 | 12 | 16 | 23 | 31 |
|---|---|---|---|---|---|---|
| OPCD | | SID | TID | PLNG | PID | |
| RTCD | | RSID | | | RPID | |
| data0 ||||||||
| data1 ||||||||
| ⋮ ||||||||

FIG.6C

| bit0 | 8 | 12 | 16 | 23 | 31 |
|---|---|---|---|---|---|
| OPCD | SID | | PLNG | PID | |
| adrs0 ||||||
| adrs1 ||||||

FIG.6D

| bit0 | 8 | 12 | 16 | 23 | 31 |
|---|---|---|---|---|---|
| OPCD | SID | | PLNG | PID | |
| RTCD | RSID | | | RPID | |

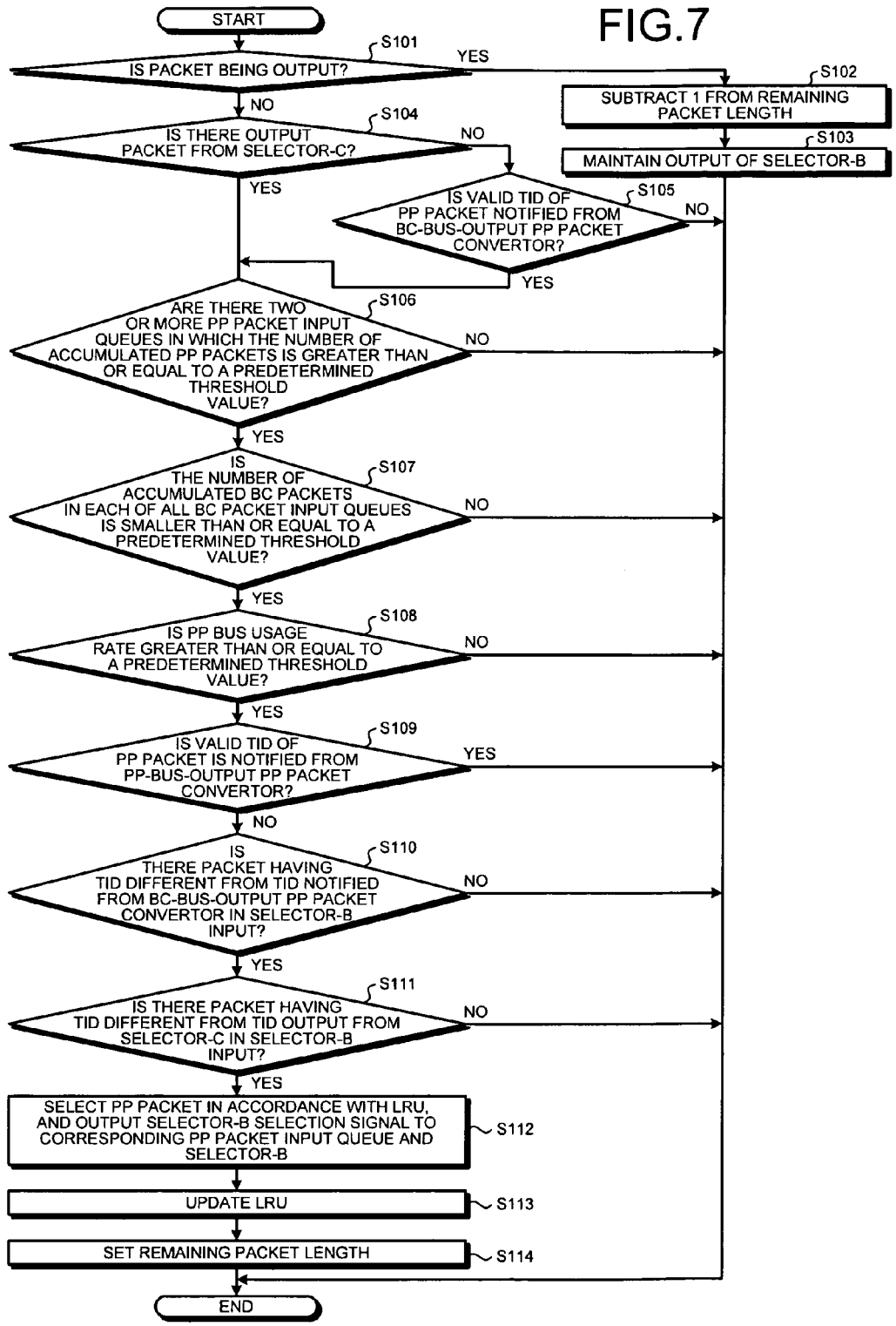

INFORMATION PROCESSING DEVICE, DATA TRANSFER CIRCUIT, AND CONTROL METHOD OF INFORMATION PROCESSING DEVICE

CROSS-REFERENCE TO RELATED APPLICATION

This application is a continuation of International Application No. PCT/JP2008/055294, filed on Mar. 21, 2008, the entire contents of which are incorporated herein by reference.

FIELD

The embodiments discussed herein are directed to an information processing device, a data transfer circuit, and a control method of an information processing device.

BACKGROUND

Conventionally, a computer system is known in which a plurality of system boards (SBs) constituted by a Central Processing Unit (CPU), an Input Output (IO) mechanism, a memory, and a system controller (SC) are connected by a cross bar system constituted by a plurality of cross bar boards (XBBs).

Here, to efficiently perform data transfer through a bus between the cross bar boards, for example, as a conventional technique, a transaction issuance control method of a parallel computer system in which a broadcast packet of broadcast (BC) transferred from a CPU of a system board to all the CPUs of all the system boards and a unicast packet of unicast (UC) transferred from a CPU of a system board to another CPU of another system board are input into a selector, and the unicast packet is preferentially-transferred to the bus between the cross bar boards is proposed.

Furthermore, for example, as a conventional technique, a disk array control device including two types of buses which are a broadcast bus for transferring broadcast packets and a unicast bus for transferring unicast packets as transfer paths between the cross bar boards is proposed.

[Patent Document 1] Japanese Laid-open Patent Publication No. 2002-169786
[Patent Document 2] Japanese Laid-open Patent Publication No. 2000-267816

However, in the above conventional technique, transfer/reception delay of the broadcast packet may be caused because the unicast packet is preferentially-transferred to the bus between the cross bar boards.

Also, in the above conventional technique, the broadcast bus and the unicast bus are not used efficiently as a whole because the number of the unicast packets is overwhelmingly greater than the number of the broadcast packets and packet congestion occurs in the unicast bus while the broadcast packet is not transferred at all in the broadcast bus.

SUMMARY

According to an aspect of an embodiment of the invention, a data transfer circuit transfers data from one control circuit to another control circuit other than the one control circuit, and is connected to a plurality of control circuits to which an arithmetic processing circuit is connected and the other data transfer circuit. The data transfer circuit includes a first reception unit that receives first data transmitted from the one control circuit to all the control circuits connected to the other data transfer circuit; a second reception unit that receives second data transmitted from the one control circuit to one of the control circuits connected to the other data transfer circuit; a selection unit that selects either the first data or the second data; a first bus output unit that transmits either the first or second data selected by the selection unit to all the control circuits connected to the other data transfer circuit via the other data transfer circuit, the first bus output unit being connected to the other data transfer circuit; a second bus output unit that transmits the second data to one of the control circuits connected to the other data transfer circuit via the other data transfer circuit, the second bus output unit being connected to the other data transfer circuit; a first bus input unit that receives third data transmitted to the plurality of control circuits from one of the control circuits connected to the other data transfer circuit via the other data transfer circuit, the first bus input unit being connected to the other data transfer circuit; a second bus input unit that receives fourth data transmitted to one of the plurality of control circuits from one of the control circuits connected to the other data transfer circuit via the other data transfer circuit, the second bus input unit being connected to the other data transfer circuit; and a data transmission unit that selects one of the first to fourth data and transmits the selected data to the one control circuit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram depicting an example of a threshold value storage table;
FIG. 6A is a diagram depicting an example of a format of a PP packet (request packet);
FIG. 6B is a diagram depicting an example of a format of a PP packet (response packet);
FIG. 6C is a diagram depicting an example of a format of a BC packet (request packet);
FIG. 6D is a diagram depicting an example of a format of a BC packet (response packet);
FIG. 7 is a flowchart depicting a selector control processing procedure of the first embodiment.

DESCRIPTION OF EMBODIMENTS

Preferred embodiments of the present invention will be explained with reference to accompanying drawings. In the description below, as examples of the embodiments, a first embodiment, a second embodiment, and a third embodiment will be described.

[a] First Embodiment

Figure 1:
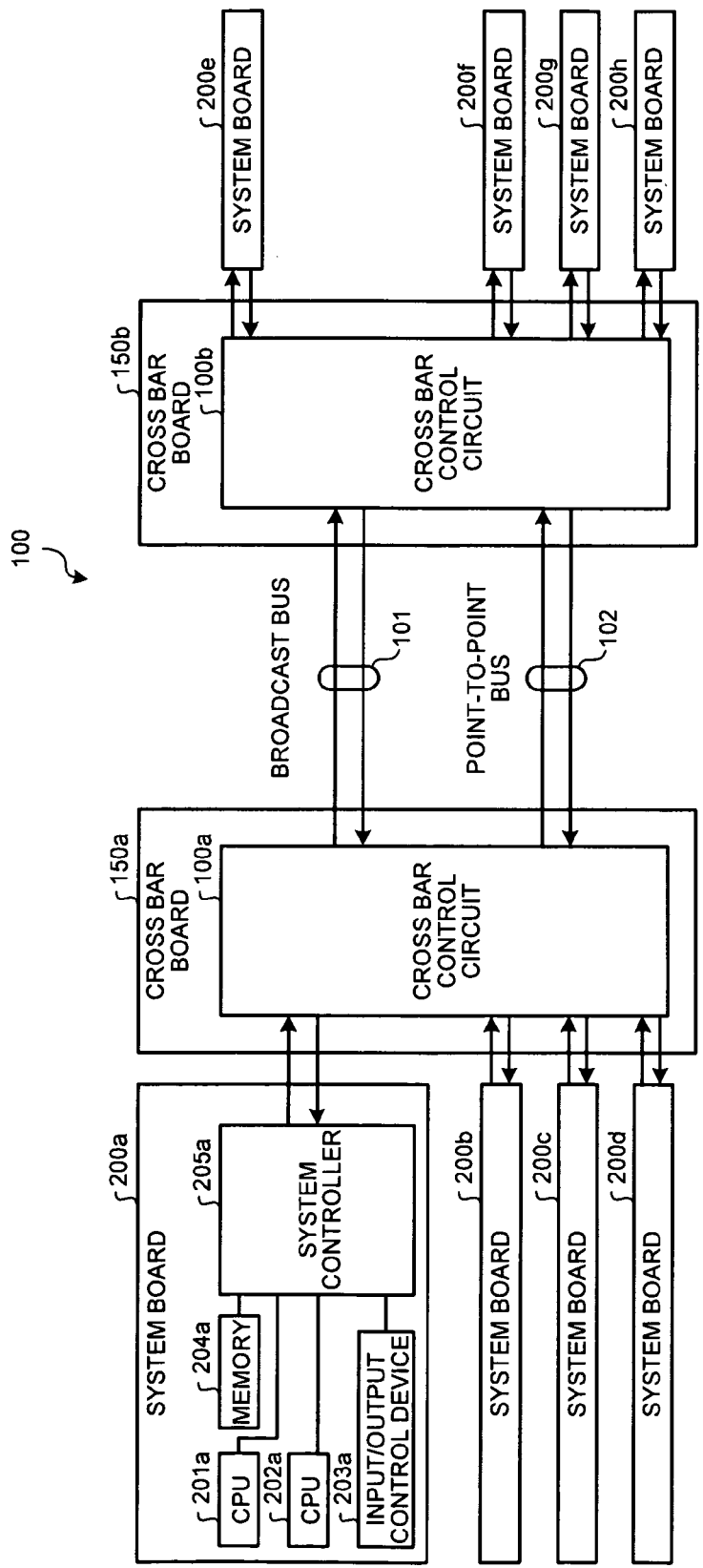
FIG. 1 is a block diagram depicting a configuration of an information processing device according to an example of a first embodiment.

First, an example of a first embodiment will be described with reference to FIGS. 1 to 8. FIG. 1 is a block diagram depicting a configuration of an information processing device according to the example of the first embodiment. As illustrated in FIG. 1, an information processing device 100 according to the example of the first embodiment includes a cross bar board 150a including a cross bar control circuit 100a connected to a system board 200a including a system controller 205a connected to two CPUs of CPU 201a and CPU 202a, an input/output control device 203a, and a memory 204a. The system board 200a transmits/receives packets to/from the cross bar control circuit 100a via the system controller 205a.

Also, system boards 200b, 200c, and 200d having the same configuration as that of the system board 200a are connected to the cross bar control circuit 100a in the same manner as the system board 200a. The system boards 200b, 200c, and 200d also transmit/receive packets to/from the cross bar control circuit 100a in the same manner as the system board 200a.

System boards 200e, 200f, 200g, and 200h are connected to a cross bar control circuit 100b of a cross bar board 150b a in the same manner as the system board 200a, 200b, 200c, and 200d are connected to the cross bar control circuit 100a.

The cross bar control circuit 100a includes interfaces for transmitting/receiving packets to/from the system boards 200a, 200b, 200c, and 200d respectively. Similarly, the cross bar control circuit 100b includes interfaces for transmitting/receiving packets to/from the system boards 200e, 200f, 200d, and 200h respectively.

The cross bar control circuits 100a and 100b are connected to each other so that the cross bar control circuits 100a and 100b can transmit/receive packets to/from each other. In other words, the system boards 200a to 200h are connected to each other so that the system boards 200a to 200h can transmit/receive packets to/from any other system board. The cross bar control circuits 100a and 100b transmit a packet to a destination indicated by the header of the packet.

The cross bar control circuits 100a and 100b are connected to each other by two buses, which are a broadcast bus 101 for transmitting a broadcast packet from a system board to all system boards other than the system board and a point-to-point bus 102 for transmitting a unicast packet from a system board to another system board.

When unicast packets passing through the point-to-point bus 102 are too many, the unicast packets are output by using the broadcast bus 101 in addition to the point-to-point bus 102 if the broadcast bus 101 is not used. In this way, the unicast packets can be output quickly and efficiently, so that use efficiency of the broadcast bus 101 and the point-to-point bus 102 can be increased as a whole.

The point-to-point means the unicast. Hereinafter, the point-to-point is abbreviated as PP, and the broadcast is abbreviated as BC. Therefore, the point-to-point bus is abbreviated as PP bus, and the broadcast bus is abbreviated as BC bus.

Although FIG. 1 depicts the information processing device 100 having a simplified configuration in which two cross bar boards to which four system boards are connected respectively face each other, the number of the cross bar boards facing each other and the number of the system boards connected a cross bar board are not limited to two and four respectively.

Figure 2:
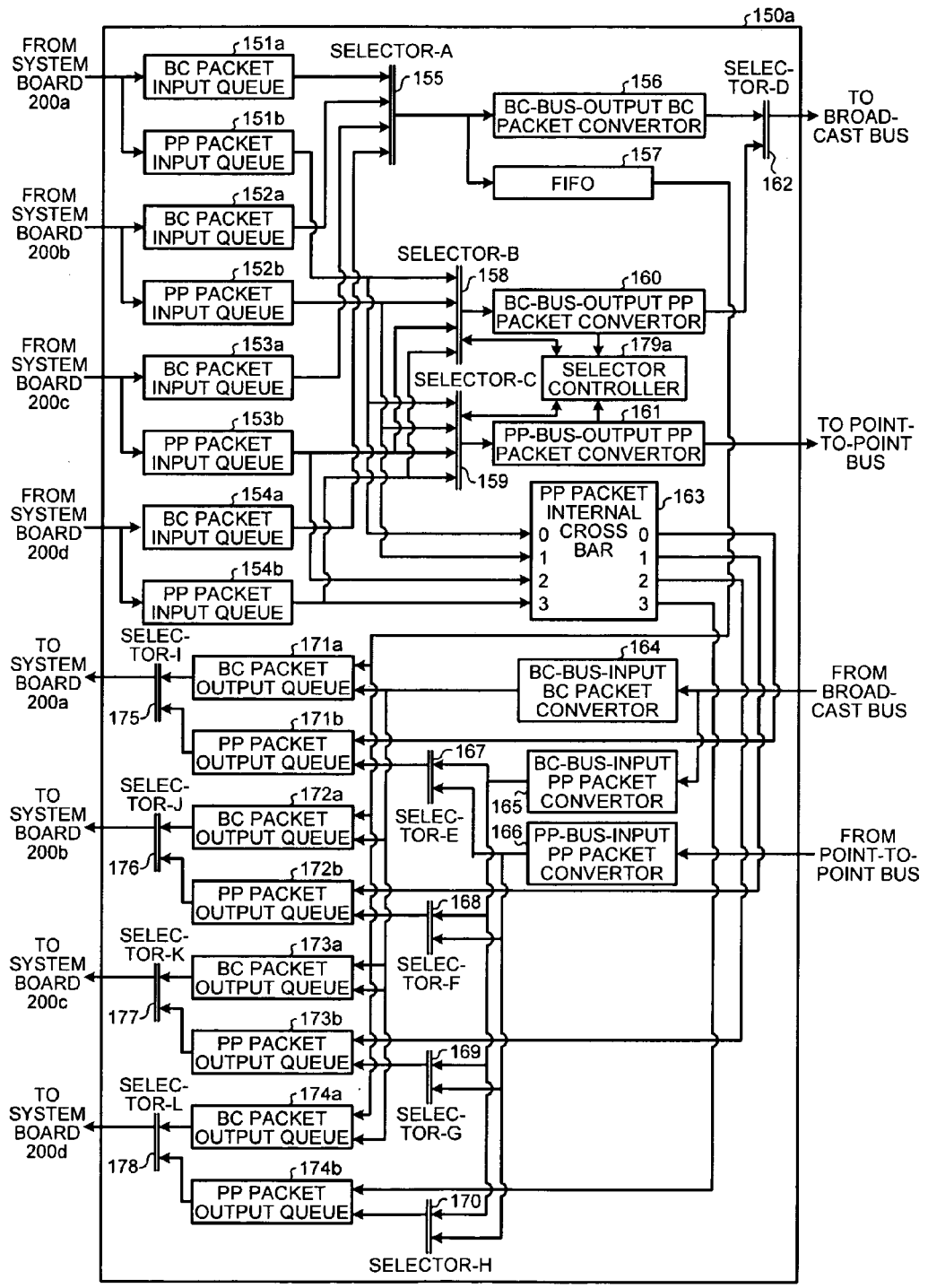
FIG. 2 is a functional block diagram depicting a configuration of a cross bar board according to the example of the first embodiment.

Next, a configuration of the cross bar board of the information processing device according to the example of the first embodiment will be described. FIG. 2 is a functional block diagram depicting a configuration of the cross bar board of the information processing device according to the example of the first embodiment.

As illustrated in FIG. 2, the cross bar board 150a in the information processing device according to the example of the first embodiment includes a BC packet input queue 151a and a PP packet input queue 151b which receive an input packet from the system board 200a, a BC packet input queue 152a and a PP packet input queue 152b which receive an input packet from the system board 200b, a BC packet input queue 153a and a PP packet input queue 153b which receive an input packet from the system board 200c, and a BC packet input queue 154a and a PP packet input queue 154b which receive an input packet from the system board 200d.

Also, the cross bar board 150a includes a BC packet output queue 171a and a PP packet output queue 171b which accumulate packets to be output to the system board 200a, a BC packet output queue 172a and a PP packet output queue 172b which accumulate packets to be output to the system board 200b, a BC packet output queue 173a and a PP packet output queue 173b which accumulate packets to be output to the system board 200c, and a BC packet output queue 174a and a PP packet output queue 174b which accumulate packets to be output to the system board 200d.

A packet input from the system board 200a to the cross bar board 150a is sorted into the BC packet input queue 151a when the type of the packet (BC packet type or PP packet type) indicated by Operation Code (OPCD) or tag information is BC packet, and the packet is sorted into the PP packet input queue 151b when the type of the packet is PP packet.

Similarly, packets input from the system boards 200b, 200c, and 200d to the cross bar board 150a are sorted into the BC packet input queues 152a, 153a, and 154a respectively when the type of the packets indicated by OPCD is BC packet, and the packets are sorted into the PP packet input queues 152b, 153b, and 154b respectively when the type of the packets is PP packet.

The BC packet input queues 151a, 152a, 153a, and 154a output the accumulated (queued) BC packets to a selector-A 155 one by one via a First In First Out (FIFO) 157.

The PP packet input queues 151b, 152b, 153b, and 154b output the accumulated PP packets to a selector-C 159 one by one when the PP packet input queues 151b, 152b, 153b, and 154b do not receive a selector-B selection signal output from a selector controller 179a to each PP packet input queue.

On the other hand, the PP packet input queues 151b, 152b, 153b, and 154b output the accumulated PP packets one by one to a selector-B 158 instead of the selector-C 159 when the PP packet input queues 151b, 152b, 153b, and 154b receive the selector-B selection signal.

The selector-A 155 outputs a plurality of input BC packets to a BC-bus-output BC packet convertor 156 and the FIFO 157 while performing priority processing using a priority control algorithm such as Least Recently Used (LRU). The BC-bus-output BC packet convertor 156 converts the input BC packet into a format for transmitting through the BC bus 101 (a format matching the bus width and transmission rate of the BC bus 101), and then outputs the converted BC packet to a selector-D 162.

The FIFO 157 outputs the input BC packet with latency to the BC packet output queues 171a, 172a, 173a, and 174a. Here, the purpose of outputting the BC packet with latency by the FIFO 157 is to guarantee the packet sequence. The packet sequence is guaranteed when the FIFO 157 adjusts output time so as to output the BC packet at the same timing as the timing at which the BC-bus-output BC packet convertor 156 outputs the BC packet, by setting the same output delay as the output delay of the BC packet output from the BC-bus-output BC packet convertor 156, which is generated by the processing time of the packet format conversion.

The selector-B 158 outputs the input PP packet to a BC-bus-output PP packet convertor 160. The BC-bus-output PP packet convertor 160 converts the input PP packet into a format for transmitting through the BC bus 101, and then outputs the converted PP packet to the selector-D 162.

The selector-C 159 outputs the input PP packet to a PP-bus-output PP packet convertor 161. The PP-bus-output PP packet convertor 161 converts the input PP packet into a format for transmitting through the PP bus 102 (a format matching the bus width and transmission rate of the PP bus 102), and then outputs the converted PP packet to the PP bus 102.

The selector-D 162 outputs the BC packet from the BC-bus-output BC packet convertor 156 to the BC bus 101 in preference to the PP packet from the BC-bus-output PP packet convertor 160. Specifically, the selector-D 162 outputs the PP packet from the BC-bus-output PP packet convertor 160 to the BC bus 101 only when there is no BC packet from the BC-bus-output BC packet convertor 156.

On the other hand, while the selector-D 162 is outputting the PP packet from the BC-bus-output PP packet convertor 160, the selector-D 162 performs exclusive control of packet so that neither another PP packet nor any BC packet is input and output.

The selector-B 158 and the selector-C 159 are controlled by the selector controller 179a on the basis of input information from the BC-bus-output PP packet convertor 160 and the PP-bus-output PP packet convertor 161 or the like. A configuration of the selector controller 179a and control of the selectors will be described below with reference to FIG. 4.

A PP packet internal cross bar 163 is a device for switching a PP packet which is output from the PP packet input queue 151b, 152b, 153b, or 154b and whose Target ID (TID) that indicates a destination system board indicates a system board under the control of the PP packet internal cross bar 163, and directly outputting the PP packet from the inside of the PP packet internal cross bar 163 to the destination system board. Details of a configuration of the PP packet internal cross bar 163 will be described below with reference to FIG. 3.

For example, it is assumed that a PP packet output from the PP packet input queue 151b has TID indicating a destination of a system board under the control of the PP packet internal cross bar 163. The PP packet which is output from the PP packet input queue 151b and whose destination is a system board under the control of the PP packet internal cross bar 163 is input from an input port 0 of the PP packet internal cross bar 163 to the PP packet internal cross bar 163.

When the PP packet input from the input port 0 to the PP packet internal cross bar 163 has TID indicating the system board 200a as the destination, the PP packet is output from an output port 0 of the PP packet internal cross bar 163 to the PP packet output queue 171b. Similarly, when a PP packet has TID indicating the system board 200b, 200c, or 200d as the destination, the PP packet is output from an output port 1, an output port 2, or an output port 3 of the PP packet internal cross bar 163 to the PP packet output queue 172b, 173b, or 174b respectively.

Further, similarly, PP packets which are output from the PP packet input queues 152b, 153b, and 154b respectively and have TID indicating a system board under the control of the PP packet internal cross bar 163 as the destination are output from one of the output port 1, the output port 2, and an output port 3 depending on the TID to the PP packet output queue 172b, 173b, or 174b respectively.

A BC-bus-input BC packet convertor 164 determines whether a packet transmitted from another cross bar board via the BC bus 101 is a BC packet or a PP packet by referring to the OPCE or the tag information. When the packet is a BC packet, the BC-bus-input BC packet convertor 164 performs format conversion necessary for processing in a system board on the BC packet, and then inputs the BC packet into the BC packet output queues 171a, 172a, 173a, and 174a.

The format conversion of the BC packet performed by the BC-bus-output BC packet convertor 156 is a reverse conversion of the format conversion of the BC packet performed by the BC-bus-input BC packet convertor 164, and vice versa.

A BC-bus-input PP packet convertor 165 determines whether a packet transmitted from another cross bar board via the BC bus 101 is a BC packet or a PP packet by referring to the OPCE or the tag information. When the packet is a PP packet, the BC-bus-input PP packet convertor 165 performs format conversion necessary for processing in a system board on the PP packet, and then inputs the PP packet into one of a selector-E 167 disposed in a previous stage of the PP packet output queue 171b, a selector-F 168 disposed in a previous stage of the PP packet output queue 172b, a selector-G 169 disposed in a previous stage of the PP packet output queue 173b, and a selector-H 170 disposed in a previous stage of the PP packet output queue 174b depending on the TID.

The format conversion of the PP packet performed by the BC-bus-output PP packet convertor 160 is a reverse conversion of the format conversion of the PP packet performed by the BC-bus-input PP packet convertor 165, and vice versa.

A PP-bus-input PP packet convertor 166 performs format conversion necessary for processing in a system board on a PP packet transmitted from another cross bar board via the PP bus 102, and then inputs the PP packet into one of the selector-E 167 disposed in a previous stage of the PP packet output queue 171b, the selector-F 168 disposed in a previous stage of the PP packet output queue 172b, the selector-G 169 disposed in a previous stage of the PP packet output queue 173b, and the selector-H 170 disposed in a previous stage of the PP packet output queue 174b depending on the TID.

The format conversion of the PP packet performed by the PP-bus-output PP packet convertor 161 is a reverse conversion of the format conversion of the PP packet performed by the PP-bus-input PP packet convertor 166, and vice versa.

The selector-E 167 mediates between the PP packet input from the BC-bus-input PP packet convertor 165 to the PP packet output queue 171*b* and the PP packet input from the PP-bus-input PP packet convertor 166 to the PP packet output queue 171*b*.

Similarly, the selector-F 168, the selector-G 169, and the selector-H 170 respectively mediate between the PP packets input from the BC-bus-input PP packet convertor 165 to the PP packet output queues 172*b*, 173*b*, and 174*b* and the PP packets input from the PP-bus-input PP packet convertor 166 to the PP packet output queues 172*b*, 173*b*, and 174*b*.

A selector-I 175 mediates between the packets output from the BC packet output queue 171*a* and the PP packet output queue 171*b* to the system board 200*a*, and preferentially outputs the BC packet from the BC packet output queue 171*a* to the system board 200*a*.

Similarly, a selector-J 176, a selector-K 177, and a selector-L 178 respectively mediate between the packets output from the BC packet output queues 172*a*, 173*a*, and 174*a* and the PP packet output queues 172*b*, 173*b*, and 174*b* to the system boards 200*b*, 200*c*, and 200*d*, and preferentially outputs the BC packets to the system boards 200*b*, 200*c*, and 200*d*.

Figure 3:
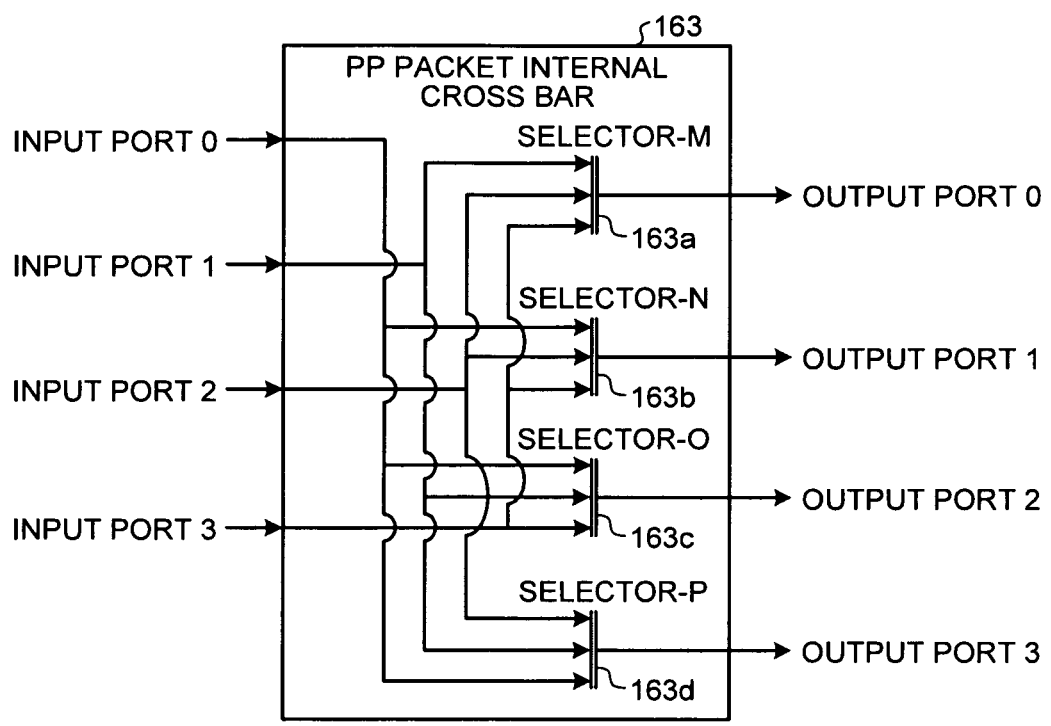
FIG. 3 is a functional block diagram depicting a configuration of a PP packet internal cross bar according to the example of the first embodiment.

Next, a configuration of the PP packet internal cross bar according to the example of the first embodiment will be described. FIG. 3 is a functional block diagram depicting the configuration of the PP packet internal cross bar according to the example of the first embodiment. As illustrated in FIG. 3, the PP packet input from the system board 200*a* via the input port 0 is input to a selector-N 163*b*, a selector-O 163*c*, and a selector-P 163*d* which mediate and output the PP packet to the output ports 1, 2, and 3 which output the PP packet to the system boards 200*b*, 200*c*, and 200*d*.

Similarly, the PP packet input from the system board 200*b* via the input port 1 is input to a selector-M 163*a*, the selector-O 163*c*, and the selector-P 163*d* which mediate and output the PP packet to the output ports 0, 2, and 3 which output the PP packet to the system boards 200*a*, 200*c*, and 200*d*.

Similarly, the PP packet input from the system board 200*c* via the input port 2 is input to the selector-M 163*a*, the selector-N 163*b*, and the selector-P 163*d* which mediate and output the PP packet to the output ports 0, 1, and 3 which output the PP packet to the system boards 200*a*, 200*b*, and 200*d*.

Similarly, the PP packet input from the system board 200*d* via the input port 3 is input to the selector-M 163*a*, the selector-N 163*b*, and the selector-O 163*c* which mediate and output the PP packet to the output ports 0, 1, and 2 which output the PP packet to the system boards 200*a*, 200*b*, and 200*c*.

The selector-M 163*a*, the selector-N 163*b*, the selector-O 163*c*, and the selector-P 163*d* refer to the TIDs of the input PP packets, select a PP packet whose TID matches TID of the system board that is the output destination of the PP packet output queue connected to the output port of the selectors, and output the PP packet from the output port.

While the selector-M 163*a*, the selector-N 163*b*, the selector-O 163*c*, and the selector-P 163*d* select a PP packet from the input PP packets and output the PP packet from the output port, when there are a plurality of PP packets to be output, the selectors control the output sequence of the PP packets by using a priority control algorithm such as LRU.

While outputting a PP packet, the selector-M 163*a*, the selector-N 163*b*, the selector-O 163*c*, and the selector-P 163*d* perform exclusive control of the PP packet so that another PP packet is not input and output.

Figure 4:
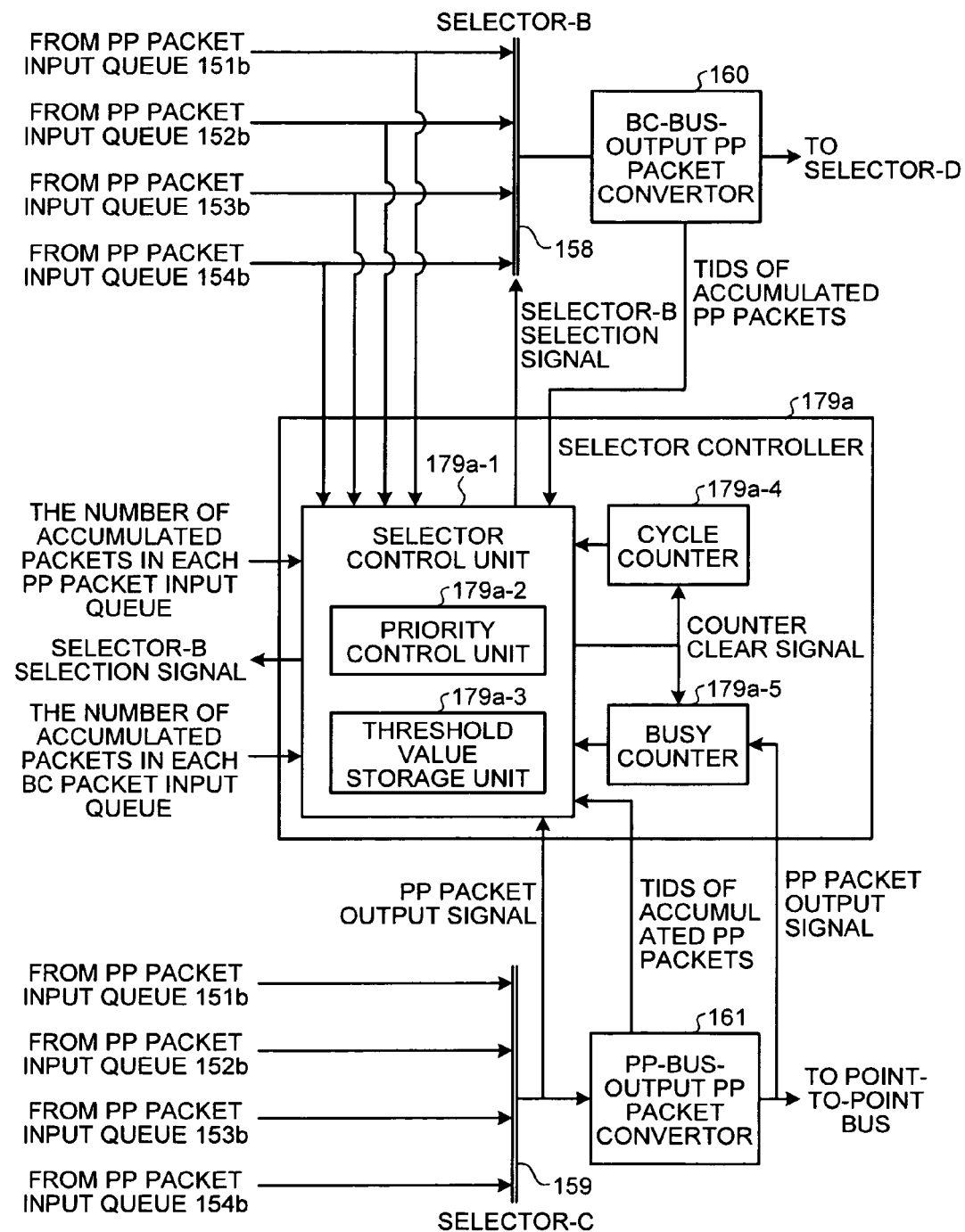
FIG. 4 is a functional block diagram depicting a configuration of a selector controller according to the example of the first embodiment.

Next, a configuration of the selector controller according to the example of the first embodiment will be described. FIG. 4 is a functional block diagram depicting the configuration of the selector controller according to the example of the first embodiment. As illustrated in FIG. 4, the selector controller 179*a* according to the example of the first embodiment includes a selector control unit 179*a*-1, a cycle counter 179*a*-4, and a busy counter 179*a*-5.

The selector control unit 179*a*-1 is a control device such as a microcomputer that performs an overall control of the selector controller 179*a*, and further includes a priority control unit 179*a*-2 and a threshold value storage unit 179*a*-3.

The priority control unit 179*a*-2 stores TIDs of the PP packets output from the PP packet input queues 151*b*, 152*b*, 153*b*, and 154*b* along with identification information of the PP packet input queues, and stores TID of the PP packet output from the selector-C 159. When valid TID of the PP packet is not notified, TID is not stored. The stored valid TIDs of the PP packets are, for example, stored in accordance with an LRU algorithm.

The priority control unit 179*a*-2 receives notifications of the number of BC packets (the number of accumulated BC packets) accumulated in the BC packet input queues 151*a*, 152*a*, 153*a*, and 154*a* from the BC packet input queues, and receives notifications of the number of PP packets (the number of accumulated PP packets) accumulated in the PP packet input queues 151*b*, 152*b*, 153*b*, and 154*b* from the PP packet input queues.

The priority control unit 179*a*-2 receives notification of TIDs of BC packets accumulated in the BC-bus-output BC packet convertor 156 from the BC-bus-output BC packet convertor 156, and receives notification of TIDs of PP packets accumulated in the PP-bus-output PP packet convertor 161 from the PP-bus-output PP packet convertor 161.

The priority control unit 179*a*-2 receives notification of a cycle count value from the cycle counter 179*a*-4, and receives a busy count value from the busy counter 179*a*-5. The cycle count value is a value of a counter that is incremented at a constant frequency. The busy count value is a value of a counter that is incremented when a PP packet is output from the PP-bus-output PP packet convertor 161 at the constant frequency mentioned above. The priority control unit 179*a*-2 calculates a PP bus usage rate by dividing the busy count value by the cycle count value. The cycle count value, the busy count value, and the PP bus usage rate are cleared at a predetermined interval.

The priority control unit 179*a*-2 determines whether the priority control unit 179*a*-2 inputs the PP packet from one of the PP packet input queues 151*b*, 152*b*, 153*b*, and 154*b* into the selector-B 158 on the basis of the number of accumulated BC packets, the number of accumulated PP packets, the TIDs of BC packets, the TIDs of PP packets, and the PP bus usage rate.

The conditions to determine whether the priority control unit 179*a*-2 inputs the PP packet from one of the PP packet input queues 151*b*, 152*b*, 153*b*, and 154*b* into the selector-B 158 are Conditions 1 to 5 described below. When all of these five conditions are satisfied, it is determined that the priority control unit 179*a*-2 inputs the PP packet from one of the PP packet input queues 151*b*, 152*b*, 153*b*, and 154*b* into the selector-B 158.

Condition 1: There are, for example, two or more PP packet input queues in which the number of accumulated PP packets is greater than or equal to a predetermined threshold value.

Condition 2: The number of accumulated BC packets in each of all the BC packet input queues is smaller than or equal to a predetermined threshold value.

Condition 3: The PP bus usage rate is greater than or equal to a predetermined threshold value.

Condition 4: A valid TID of PP packet is not notified from the PP-bus-output PP packet convertor 161, in other words, there is no PP packet having valid TID in the PP-bus-output PP packet convertor 161.

Condition 5: There is TID different from TID notified from the BC-bus-output PP packet convertor 160 in valid TIDs of PP packets output form the PP packet input queues 151*b*, 152*b*, 153*b*, and 154*b*, and there is TID different from TID of PP packet output from the selector-C 159 in valid TIDs of PP packets output form the PP packet input queues 151*b*, 152*b*, 153*b*, and 154*b*.

When the priority control unit 179*a*-2 determines whether the priority control unit 179*a*-2 inputs the PP packet from one of the PP packet input queues 151*b*, 152*b*, 153*b*, and 154*b* into the selector-B 158, the priority control unit 179*a*-2 determines the PP packet input queue from which the PP packet is output by using a priority control algorithm such as LRU.

When the priority control unit 179*a*-2 determines the PP packet input queue from which the PP packet is output, the priority control unit 179*a*-2 outputs the selector-B selection signal to cause the selector-B 158 to output the PP packet to the determined PP packet input queue, and also outputs the selector-B selection signal indicating that the selector-B 158 is selected as the input destination of the PP packet to the selector-B.

As illustrated in an example of a threshold value storage table in FIG. 5, the threshold value storage unit 179*a*-3 stores threshold values of the number of accumulated packets in each PP packet input queue, the number of accumulated packets in each BC packet input queue, and the PP bus usage rate. The threshold values $\alpha1$ to $\alpha4$, $\beta1$ to $\beta4$, and $\gamma$ are variable setting values that can be adjusted according to a bus width and transmission rate between the system board and the cross bar board, and a bus width and transmission rate between the cross bar boards.

FIG. 6A is a diagram depicting an example of a format of the PP packet (request packet), FIG. 6B is a diagram depicting an example of a format of the PP packet (response packet), FIG. 6C is a diagram depicting an example of a format of the BC packet (request packet), and FIG. 6D is a diagram depicting an example of a format of the BC packet (response packet).

First, as illustrated in FIG. 6A, the PP packet (request packet) includes fields of an preamble unit including Operation Code (OPCD) that indicates packet type, Source ID (SID) that is identification information of the system board that is the transmission source of the packet, Target ID (TID) that is identification information of the system board that is the destination of the packet, Packet Length (PLNG) that indicates the packet length, and Packet ID (PID) that is identification information of the packet, and a data unit (data0, data1, and so on) that stores user data having a variable length.

The PP packet (request packet) is a packet for requesting transfer of store data to a memory and access to Input Output, input/output device (IO). In the fields of the data unit, a store address, store data, an IO access address, user data, and the like are stored.

Next, as illustrated in FIG. 6B, in the same manner as the PP packet (request packet), the PP packet (response packet) includes OPCD, SID, TID, PLNG, and PID corresponding to those of the PP packet (request packet) in the preamble unit, and further includes Return Code (RTCD) that indicates success or failure of the request of the request packet, Return Source ID (RSID) that is identification information of the system board that is the transmission source of this PP packet (response packet), and Return Packet ID (RPID) in the preamble unit.

Next, as illustrated in FIG. 6C, in the same manner as the PP packet (request packet), the BC packet (request packet) has a preamble unit including OPCD, SID, PLNG, and PID. The BC packet (request packet) is used when requesting cache snoop to synchronize cache lines, or the like. The BC packet (request packet) includes a field of address storage unit (adrs0, adrs1) for storing snoop addresses.

Next, as illustrated in FIG. 6D, in the same manner as the BC packet (request packet), the BC packet (response packet) includes OPCD, SID, PLNG, and PID corresponding to those of the BC packet (request packet) in the preamble unit, and further includes RTCD, RSID, and RPID in the preamble unit. A snoop state is an example of the BC packet (response packet). In the RTCD, a code indicating a cache state (hit, miss-hit, exclusive, share) or the like is stored.

Next, selector control processing performed by the selector controller 179*a* according to the first embodiment will be described. FIG. 7 is a flowchart depicting a selector control processing procedure of the first embodiment. As illustrated in FIG. 7, first, the priority control unit 179*a*-2 determines whether the PP packet is being output from the selector-B 158 (step S101). If it is determined that the PP packet is being output from the selector-B 158 (step S101: Yes), the process proceeds to step S102, and if it is not determined that the PP packet is being output from the selector-B 158 (step S101: No), the process proceeds to step S104.

In step S102, the priority control unit 179*a*-2 subtracts 1 from a counter value of a remaining packet length of the above described PP packet that is stored in a predetermined recording area. Then, the priority control unit 179*a*-2 maintains the output of the above described PP packet from the selector-B 158 (step S103). When step S103 ends, the selector control processing ends.

In step S104, the priority control unit 179*a*-2 determines whether there is an output of PP packet from the selector-C 159. If it is determined that there is an output of PP packet from the selector-C 159 (step S104: Yes), the process proceeds to step S106, and if it is not determined that there is an output of PP packet from the selector-C 159 (step S104: No), the process proceeds to step S105.

In step S105, the priority control unit 179*a*-2 determines whether valid TID of PP packet is notified from the BC-bus-output PP packet convertor 160. In other words, the priority control unit 179*a*-2 determines whether there is a PP packet having valid TID in the BC-bus-output PP packet convertor 160. If it is determined that valid TID of PP packet is notified from the BC-bus-output PP packet convertor 160 (step S105: Yes), the process proceeds to step S106, and if it is not determined that valid TID of PP packet is notified from the BC-bus-output PP packet convertor 160 (step S105: No), the selector control processing ends.

In step S106, the priority control unit 179*a*-2 determines whether there are, for example, two or more PP packet input queues in which the number of accumulated PP packets is greater than or equal to a predetermined threshold value (for example, refer to FIG. 5). If it is determined that there are two or more PP packet input queues in which the number of accumulated PP packets is greater than or equal to the predetermined threshold value (step S106: Yes), the process proceeds to step S107, and if it is not determined that there are two or more PP packet input queues in which the number of accumulated PP packets is greater than or equal to the predetermined threshold value (step S106: No), the selector control processing ends.

In step S107, the priority control unit 179*a*-2 determines whether the number of accumulated BC packets in each of all the BC packet input queues is smaller than or equal to a predetermined threshold value (for example, refer to FIG. 5). If it is determined that the number of accumulated BC packets in each of all the BC packet input queues is smaller than or equal to the predetermined threshold value (step S107: Yes), the process proceeds to step S108, and if it is not determined that the number of accumulated BC packets in each of all the BC packet input queues is smaller than or equal to the predetermined threshold value (step S107: No), the selector control processing ends.

In step S108, the priority control unit 179a-2 determines whether the PP bus usage rate is greater than or equal to a predetermined threshold value (for example, refer to FIG. 5). If it is determined that the PP bus usage rate is greater than or equal to the predetermined threshold value (step S108: Yes), the process proceeds to step S109, and if it is not determined that the PP bus usage rate is greater than or equal to the predetermined threshold value (step S108: No), the selector control processing ends.

In step S109, the priority control unit 179a-2 determines whether valid TID of PP packet is notified from the PP-bus-output PP packet convertor 161. In other words, the priority control unit 179a-2 determines whether there is a PP packet having valid TID in the PP-bus-output PP packet convertor 161. If it is determined that valid TID of PP packet is notified from the PP-bus-output PP packet convertor 161 (step S109: Yes), the selector control processing ends, and if it is not determined that valid TID of PP packet is notified from the PP-bus-output PP packet convertor 161 (step S109: No), the process proceeds to step S110.

In step S110, the priority control unit 179a-2 determines whether there is TID different from TID notified from the BC-bus-output PP packet convertor 160 in valid TIDs of PP packets output form the PP packet input queues 151b, 152b, 153b, and 154b. If it is determined that there is TID different from TID notified from the BC-bus-output PP packet convertor 160 (step S110: Yes), the process proceeds to step S111, and if it is not determined that there is TID different from TID notified from the BC-bus-output PP packet convertor 160 (step S110: No), the selector control processing ends.

In step S111, the priority control unit 179a-2 determines whether there is TID different from TID of PP packet output from the selector-C 159 in valid TIDs of PP packets output form the PP packet input queues 151b, 152b, 153b, and 154b. If it is determined that there is TID different from TID notified from the selector-C 159 (step S111: Yes), the process proceeds to step S112, and if it is not determined that there is TID different from TID notified from the selector-C 159 (step S111: No), the selector control processing ends.

By the processing of step S111, the PP packet having the same TID is exclusively controlled so that the PP packet is not output from the selector-B 158 to the BC bus 101 at the same time when the PP packet is output from the selector-C 159 to the PP bus 102.

In step S112, the priority control unit 179a-2 selects a PP packet which is output from one of the PP packet input queues 151b, 152b, 153b, and 154b by selecting valid TID of PP packet output from the PP packet input queues 151b, 152b, 153b, and 154b in accordance with LRU, and outputs the selector-B selection signal to the PP packet input queue corresponding to the selected PP packet and the selector-B 158.

Then, the priority control unit 179a-2 updates LRU that stores valid TIDs of PP packets output from the PP packet input queues 151b, 152b, 153b, and 154b (step S113). Then, the priority control unit 179a-2 sets the packet length of the PP packet selected by the processing of step S112 to the counter value of the remaining packet length of PP packet that is stored in a predetermined recording area (step S114). When this processing ends, the selector control processing ends.

Figure 8:
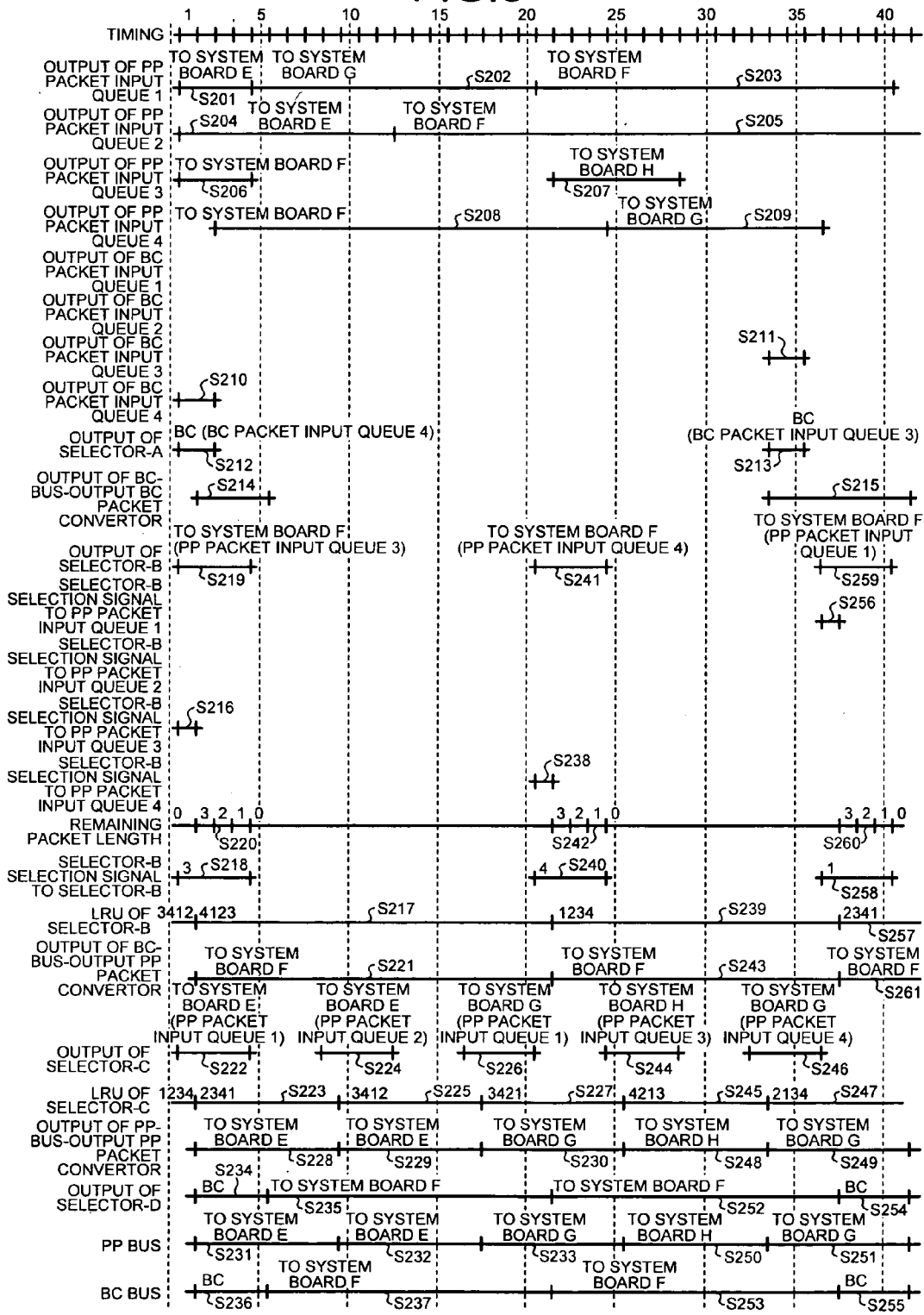
FIG. 8 is a timing chart of processing in a selector control unit of the first embodiment.

Next, timing of processing in the selector control unit of the first embodiment will be described. FIG. 8 is a timing chart of the processing in the selector control unit of the first embodiment. In the description below, the BC packet input queue 151a is abbreviated as BC packet input queue 1, the BC packet input queue 152a is abbreviated as BC packet input queue 2, the BC packet input queue 153a is abbreviated as BC packet input queue 3, and the BC packet input queue 154a is abbreviated as BC packet input queue 4.

The PP packet input queue 151b is abbreviated as PP packet input queue 1, the PP packet input queue 152b is abbreviated as PP packet input queue 2, the PP packet input queue 153b is abbreviated as PP packet input queue 3, and the PP packet input queue 154b is abbreviated as PP packet input queue 4.

The system board 200a is abbreviated as system board A, the system board 200b is abbreviated as system board B, the system board 200c is abbreviated as system board C, the system board 200d is abbreviated as system board D, the system board 200e is abbreviated as system board E, the system board 200f is abbreviated as system board F, the system board 200g is abbreviated as system board G, and the system board 200h is abbreviated as system board H.

In the timing chart illustrated in FIG. 8, timing of each processing when a BC packet and a PP packet are transmitted from the system board A connected to the cross bar board 150a to the system boards E, F, G, and H connected to the cross bar board 150b facing the cross bar board 150b. The horizontal axis of the timing chart in FIG. 8 indicates the timing for outputting a packet, and the vertical axis indicates constituent elements of the cross bar board 150a that output packets and signals.

It is assumed that the bus width ratio (data width ratios) of the BC bus 101 to the PP bus 102 is 1:2, and the bus clock frequency ratio (data transmission speed ratio) of the BC bus 101 to the PP bus 102 is 1:1. It is assumed that the ratio of an internal bus clock frequency that is the data transmission frequency of the internal bus (for example, selector-B 158, selector-C 159, and the like) of the cross bar board 150a to the clock frequency of the BC bus 101 and the PP bus 102 is 2:1.

Here, the internal bus clock frequency is the same as the operation clock frequency of the cross bar board 150a. This is because the internal bus of the cross bar board 150a operates (transmits/receives data) at the operation clock frequency.

For the sake of simplicity, it is assumed that the packet length of the BC packet is 2, and the packet length of the PP packet is 4. Therefore, 16 cycles of timing are required for the PP packet to pass though the BC bus 101, and 8 cycles of timing are required for the PP packet to pass though the PP bus 102.

In a period from the timing 1 to the timing 4, a PP packet is output from the PP packet input queue 1 to the system board E (step S201). In a period from the timing 5 to the timing 20, a PP packet is output from the PP packet input queue 1 to the system board G (step S202). In a period from the timing 21 to the timing 40, a PP packet is output from the PP packet input queue 1 to the system board F (step S203).

Similarly, in a period from the timing 1 to the timing 12, a PP packet is output from the PP packet input queue 2 to the system board E (step S204). In a period from the timing 13, a PP packet is output from the PP packet input queue 2 to the system board F (step S205).

Similarly, in a period from the timing 1 to the timing 4, a PP packet is output from the PP packet input queue 3 to the system board F (step S206). In a period from the timing 22 to the timing 28, a PP packet is output from the PP packet input queue 3 to the system board H (step S207).

Similarly, in a period from the timing 3 to the timing 24, a PP packet is output from the PP packet input queue 4 to the system board F (step S208). In a period from the timing 25 to the timing 36, a PP packet is output from the PP packet input queue 4 to the system board G (step S209).

On the other hand, in a period from the timing 1 to the timing 2, a BC packet is output from the BC packet input queue 4 (step S210). In a period from the timing 34 to the timing 35, a BC packet is output from the BC packet input queue 3 (step S211).

Here, since there is an output of BC packet from the BC packet input queue 4 in the period from the timing 1 to the timing 2, the selector-A 155 outputs the BC packet from the BC packet input queue 4 (step S212). Also, since there is an output of BC packet from the BC packet input queue 3 in the period from the timing 34 to the timing 35, the selector-A 155 outputs the BC packet from the BC packet input queue 3 (step S213).

In a period from the timing 2 to the timing 5, the BC-packet-output BC packet convertor 156 converts the format of the BC packet output from the selector-A 155 in the period from the timing 1 to the timing 2 in the input order, and outputs the converted BC packet (step S214). Similarly, in a period from the timing 34 to the timing 41, the BC-packet-output BC packet convertor 156 converts the format of the BC packet output from the selector-A 155 in the period from the timing 34 to the timing 35 in the input order, and outputs the converted BC packet (step S215). Thus, the BC-packet-output BC packet convertor 156 takes one or more cycles to convert the format of packet for one cycle timing of the BC packet output from the selector-A 155.

Since the LRU of the selector-B 158 is "3412" (that is, the LRU stores the priority order of the PP packets output from the PP packet input queues 3, 4, 1, and 2 in this priority order, and hereinafter, the number indicated by the LRU means the above priority), in the timing 1, the selector controller 179*a* outputs the selector-B selection signal to the PP packet input queue 3 (step S216). Thereafter, the LRU of the selector-B 158 is updated to "4123" (step S217). When the PP packet input queue 3 receives the selector-B selection signal from the selector controller 179*a*, the PP packet input queue 3 outputs the PP packet that will be output to the system board F to the selector-B 158 (step S206).

When the selector controller 179*a* outputs the selector-B selection signal to the PP packet input queue 3, the selector controller 179*a* also outputs the selector-B selection signal along with identification information of the PP packet input queue to which the selector-B selection signal is transmitted to the selector-B 158 (step S218). When the selector-B 158 receives the selector-B selection signal from the selector controller 179*a*, the selector-B 158 outputs the PP packet that will be output to the system board F (step S219). In the processing of step S219, every time one of the PP packets is output from the selector-B 158, the counter value of the remaining packet length is decremented to 3 to 2 to 1 to 0 (step S220).

The PP packet bound for system board F output from the selector-B 158 is format-converted by the BC-bus-output PP packet convertor 160 in a period from the timing 3 to the timing 20, and thereafter output to the selector-D 162 (step S221).

Since the LRU of the selector-C 159 is "1234", first, in a period from the timing 1 to the timing 4, the selector-C 159 outputs the PP packet bound for system board E output from the PP packet input queue 1 in step S201 (step S222). Then, the selector-C 159 updates the LRU to "2341" (step S223).

Next, since the LRU of the selector-C 159 is "2341", in a period from the timing 9 to the timing 12, the selector-C 159 outputs the PP packet bound for system board E output from the PP packet input queue 2 in step S204 (step S224). Then, the selector-C 159 updates the LRU to "3412" (step S225).

Next, since the LRU of the selector-C 159 is "3412", the selector-C 159 will output the PP packet bound for system board F output from the PP packet input queue 3 in step S206. However, this PP packet has already been output by the selector-B 158, and the next priority PP packet bound for system board F output from the PP packet input queue 4 is scheduled to be selected by the selector-B 158 next time. Hence, in a period from the timing 17 to the timing 20, the selector-C 159 outputs the PP packet bound for system board G output from the PP packet input queue 1 in step S202 (step S226). Then, the selector-C 159 updates the LRU to "3421" (step S227).

The PP-bus-output PP packet convertor 161 sequentially converts the format of the PP packets output by the selector C159 in each of step S222, step S224, and step S226 (step S228, step S229, step S230), and outputs the PP packets to each destination system board through the PP bus 102 (step S231, step S232, step S233).

On the other hand, as long as there is an input of BC packet, the selector-D 162 preferentially outputs the BC packet (step S234), and only when there is no input of BC packet, the selector-D 162 outputs the PP packet (step S235). The BC packet output from the selector-D 162 in step S234 is broadcast to all the system boards via the BC bus 101 (step S236). The PP packet output from the selector-D 162 in step S235 is transmitted to the system board F via the BC bus 101 (step S237).

When the transmission of the PP packet via the BC bus 101 in step S239 is completed in the timing 20, since the LRU of the selector-B 158 is "4123", in the timing 21, the selector controller 179*a* outputs the selector-B selection signal to the PP packet input queue 4 (step S238). Thereafter, in the timing 22, the LRU of the selector-B 158 is updated to "1234" (step S239). When the PP packet input queue 4 receives the selector-B selection signal from the selector controller 179*a*, the PP packet input queue 4 outputs the PP packet that will be output to the system board F to the selector-B 158 (step S208).

When the selector controller 179*a* outputs the selector-B selection signal to the PP packet input queue 4, the selector controller 179*a* also outputs the selector-B selection signal along with identification information of the PP packet input queue to which the selector-B selection signal is transmitted to the selector-B 158 (step S240). When the selector-B 158 receives the selector-B selection signal from the selector controller 179*a*, the selector-B 158 outputs the PP packet that will be output to the system board F (step S241). In the processing of step S241, every time one of the PP packets is output from the selector-B 158, the counter value of the remaining packet length is decremented to 3 to 2 to 1 to 0 (step S242).

The PP packet bound for system board F output from the selector-B 158 is format-converted by the BC-bus-output PP packet convertor 160 in a period from the timing 22 to the timing 37, and thereafter output to the selector-D 162 (step S243).

Since the LRU of the selector-C 159 is "3421", first, in a period from the timing 25 to the timing 28, the selector-C 159 outputs the PP packet bound for system board H output from the PP packet input queue 3 in step S207 (step S244). Then, the selector-C 159 updates the LRU to "4213" (step S245).

Next, since the LRU of the selector-C 159 is "4213", in a period from the timing 32 to the timing 35, the selector-C 159 outputs the PP packet bound for system board G output from the PP packet input queue 4 in step S209 (step S246). Then, the selector-C 159 updates the LRU to "2134" (step S247).

The PP-bus-output PP packet convertor 161 sequentially converts the format of the PP packets output by the selector C159 in each of step S244 and step S246 (step S248, step S249), and outputs the PP packets to each destination system board through the PP bus 102 (step S250, step S251).

On the other hand, since there is no input of BC packet, the selector-D 162 outputs the PP packet whose format is converted in step S248 (step S252). Then, the PP packet output from the selector-D 162 in step S252 is transmitted to the destination system board via the BC bus 101 (step S253). However, since the BC packet is output form the selector-A 155 in step S213, the selector-D 162 output this BC packet after the transmission of the PP packet in step S253 is completed (step S254). Then, the BC packet output from the selector-D 162 in step S254 is broadcast to all the system boards via the BC bus 101 (step S255).

When the transmission of the PP packet via the BC bus 101 in step S253 is completed in the timing 37, since the LRU of the selector-B 158 is "1234", in the timing 37, the selector controller 179a outputs the selector-B selection signal to the PP packet input queue 1 (step S256). Thereafter, the LRU of the selector-B 158 is updated to "2341" (step S257). When the PP packet input queue 1 receives the selector-B selection signal from the selector controller 179a, the PP packet input queue 1 outputs the PP packet that will be output to the system board F to the selector-B 158 (step S203).

When the selector controller 179a outputs the selector-B selection signal to the PP packet input queue 1, the selector controller 179a also outputs the selector-B selection signal along with identification information of the PP packet input queue to which the selector-B selection signal is transmitted to the selector-B 158 (step S258). When the selector-B 158 receives the selector-B selection signal from the selector controller 179a, the selector-B 158 outputs the PP packet that will be output to the system board F (step S259). In the processing of step S259, every time one of the PP packets is output from the selector-B 158, the counter value of the remaining packet length is decremented to 3 to 2 to 1 to 0 (step S260).

The PP packet bound for system board F output from the selector-B 158 is format-converted by the BC-bus-output PP packet convertor 160 in a period from the timing 38 (step S261). The processing after the above format conversion is the same as the processing as described above.

According to the example of the first embodiment described above, when a large number of PP packets pass through the PP bus in an information processing device such as a parallel computer in which a plurality of cross bar boards to which a plurality of system boards are connected are connected to each other via the BC bus and the PP bus, the PP packets are transmitted to another cross bar board via the BC bus only when the BC bus is not used, so that the PP packets can be transmitted quickly and efficiently. As a result, the throughput of the entire information processing device can be improved.

Since the PP packets can be transmitted quickly and efficiently, even when the bus width and the clock frequency of the BC bus and the PP bus are kept low, the influence exerted on the transmission of the PP packets may be small. Therefore, it may be possible to reduce the physical amount of the BC bus and the PP bus and the necessity of performance improvement of the buses to a minimum level, reduce the cost of the buses connecting between the cross bar boards, and thus, reduce the cost of the information processing device.

Further, since a PP packet having the same TID as the TID of a PP packet transmitted to another cross bar board via the PP bus is exclusively controlled so that the PP packet is not output from the BC bus, it is possible to avoid that different PP packets are transmitted to the same cross bar board and system board through both the BC bus and the PP bus, and thus, it is possible to avoid occurrence of packet congestion when the reception side cross bar board and system board receive PP packets.

[b] Second Embodiment

Figure 9:
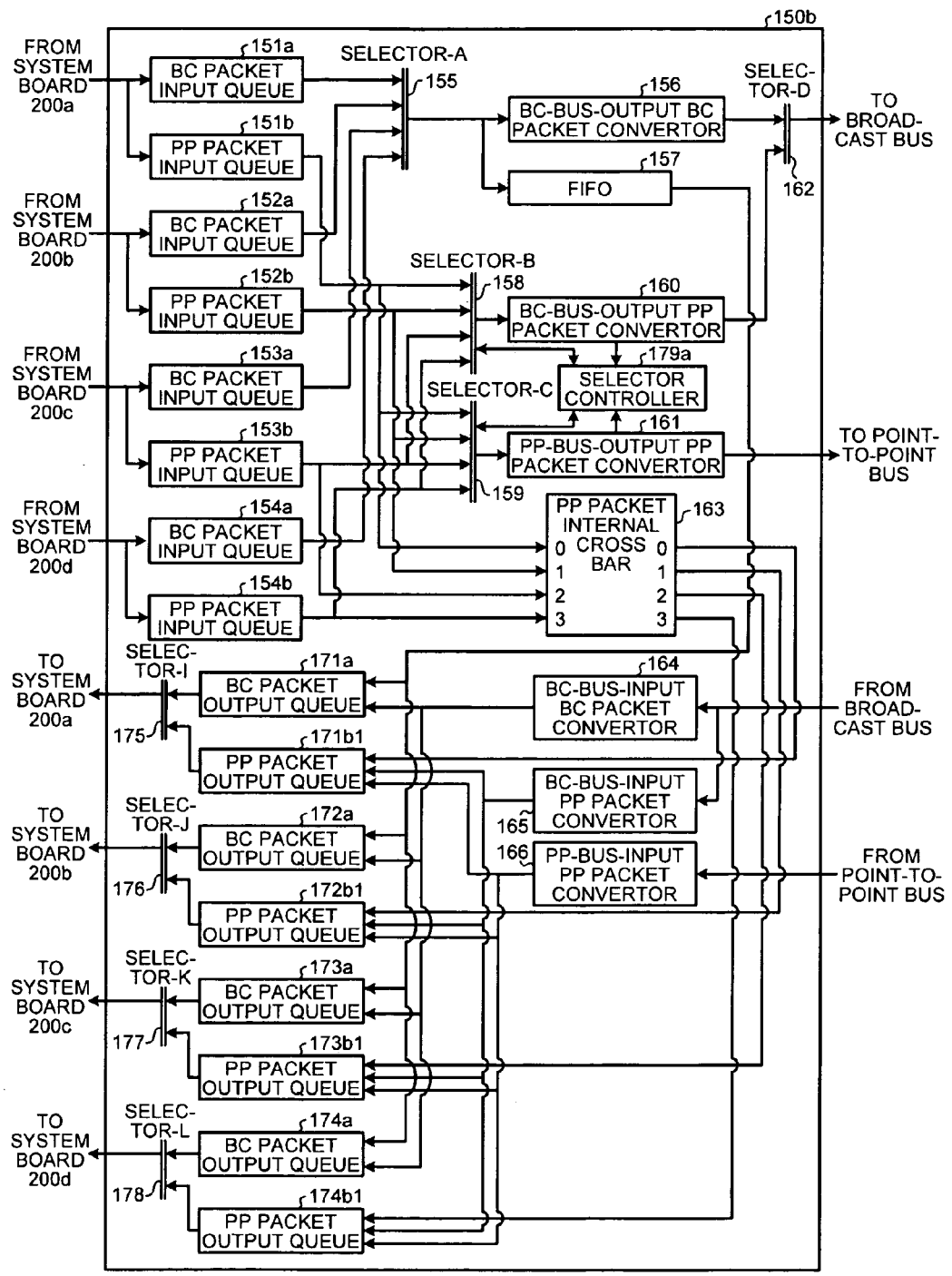
FIG. 9 is a functional block diagram depicting a configuration of a cross bar board according to an example of a second embodiment.

Next, an example of a second embodiment will be described with reference to FIGS. 9 to 12. In the description of the example of the second embodiment, only a difference between the first embodiment and the second embodiment will be described. FIG. 9 is a functional block diagram depicting a configuration of the cross bar board 150b according to the example of the second embodiment. As illustrated in FIG. 9, different from the cross bar board 150a according to the example of the first embodiment, the cross bar board 150b according to the example of the second embodiment includes a selector controller 179b instead of the selector controller 179a, a PP packet output queue 171b1 instead of the PP packet output queue 171b, a PP packet output queue 172b1 instead of the PP packet output queue 172b, a PP packet output queue 173b1 instead of the PP packet output queue 173b, and a PP packet output queue 174b1 instead of the PP packet output queue 174b, and does not include the selector-E 167, the selector-F 168, the selector-G 169, and the selector-H 170.

Figure 10:
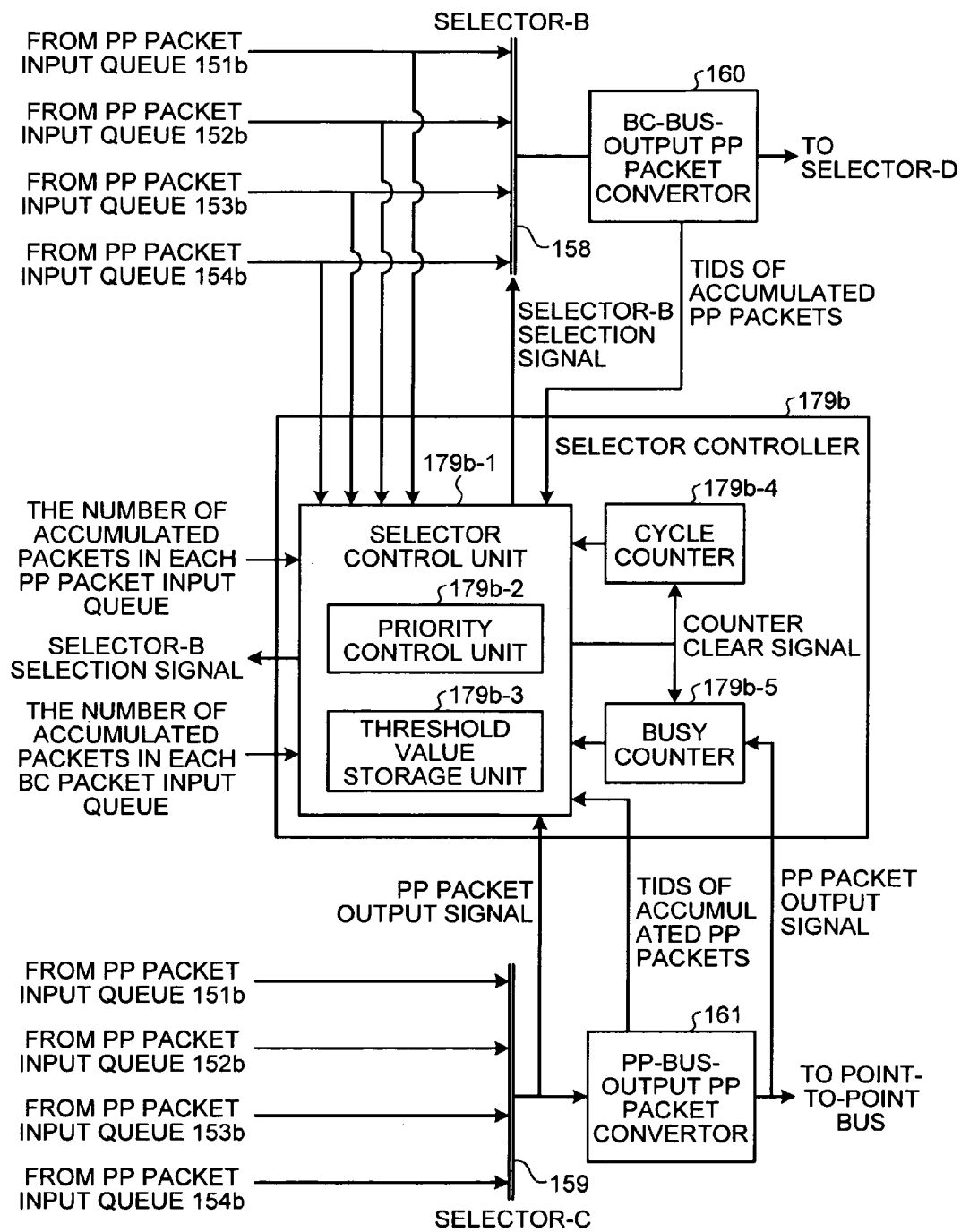
FIG. 10 is a functional block diagram depicting a configuration of a selector controller according to the example of the second embodiment.

A configuration of the selector controller 179b will be described below with reference to FIG. 10. Since the cross bar board 150b does not include the selector-E 167, the selector-F 168, the selector-G 169, and the selector-H 170, the PP packet output queue 171b1, the PP packet output queue 172b1, the PP packet output queue 173b1, and the PP packet output queue 174b1 have 3 inputs (3-write and 1-read).

Next, a configuration of the selector controller according to the example of the second embodiment will be described. FIG. 10 is a functional block diagram depicting the configuration of the selector controller according to the example of the second embodiment. As illustrated in FIG. 10, the selector controller 179b according to the example of the second embodiment includes a selector control unit 179b-1, a cycle counter 179b-4, and a busy counter 179b-5. The cycle counter 179b-4 and the busy counter 179b-5 are respectively the same as the cycle counter 179a-4 and the busy counter 179a-5 according to the example of the first embodiment.

The selector control unit 179b-1 is a control device such as a microcomputer that performs an overall control of the selector controller 179b, and further includes a priority control unit 179b-2 and a threshold value storage unit 179b-3. The threshold value storage unit 179b-3 is the same as the threshold value storage unit 179a-3 according to the example of the first embodiment.

The priority control unit 179b-2 determines whether the priority control unit 179b-2 inputs the PP packet from one of the PP packet input queues 151b, 152b, 153b, and 154b into the selector-B 158 on the basis of the number of accumulated BC packets in each BC packet input queue, the number of accumulated PP packets in each PP packet input queue, the TIDs of pp packets accumulated in the BC-bus-output PP packet convertor 160, the TIDs of PP packets accumulated in the PP-bus-output PP packet convertor 161, and the PP bus usage rate.

However, the condition to determine whether the priority control unit 179b-2 can transmit the PP packet via the BC bus 101 is relaxed compared with the example of the first embodiment. Specifically, when only the (condition 1) to the (condition 4) are satisfied, it is determined that the priority control unit 179b-2 can transmit the PP packet via the BC bus 101 without the (condition 5) being satisfied.

Therefore, the selector controller 179b need not check the TIDs of BC packets accumulated in the BC-bus-output PP packet convertor 160 and the TIDs of PP packets accumulated in the PP-bus-output PP packet convertor 161, so that the processing load is lightened compared with the selector controller 179a according to the first embodiment.

Even when the selector controller 179b does not receive TIDs of the accumulated BC packets from the BC-bus-output PP packet convertor 160 and TIDs of the accumulated PP packets from the PP-bus-output PP packet convertor 161, the selector controller 179b only has to receive a packet accumulation signal indicating that the packets are accumulated.

Figure 11:
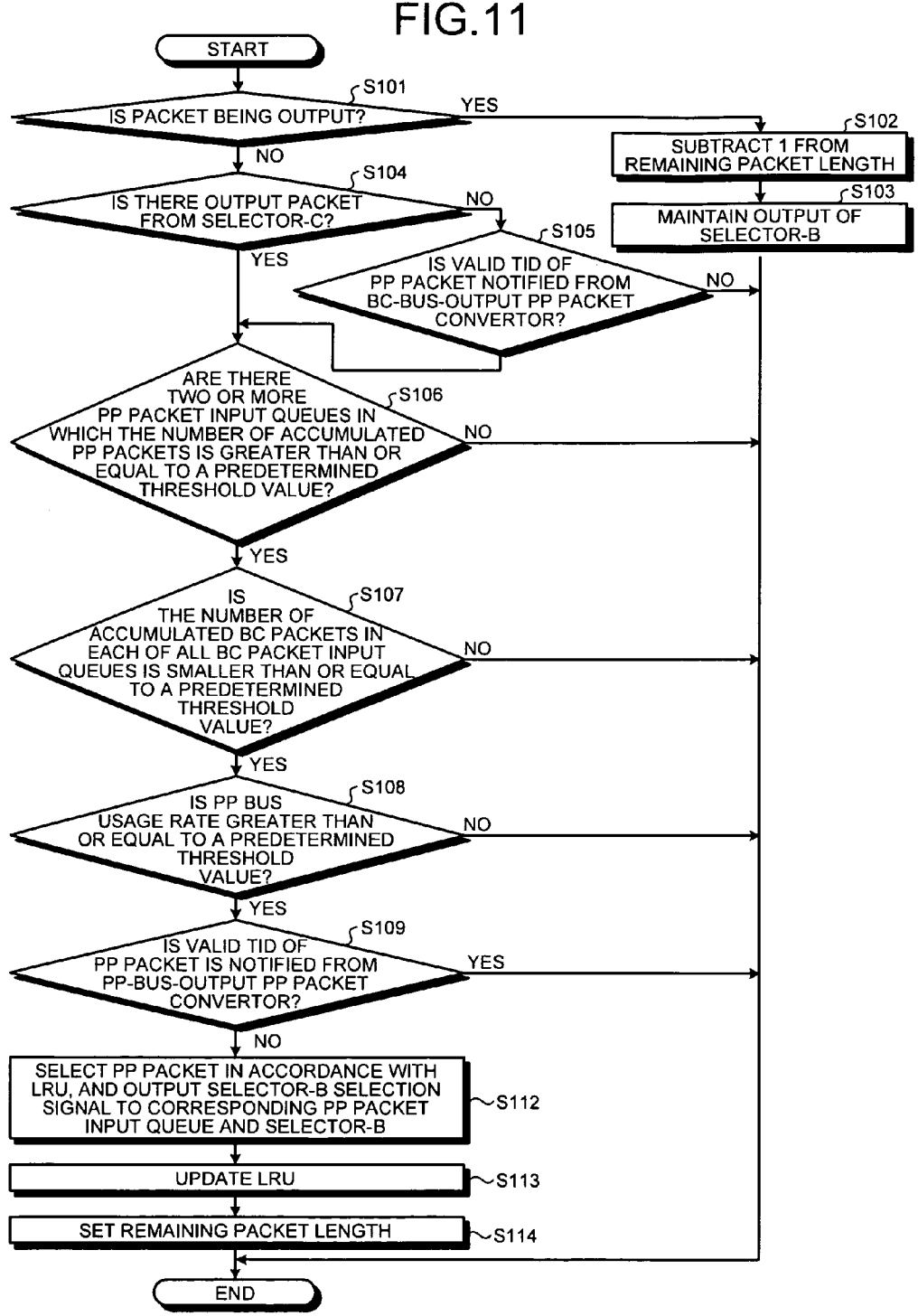
FIG. 11 is a flowchart depicting a selector control processing procedure of the second embodiment.

FIG. 11 is a flowchart depicting a selector control processing procedure of the second embodiment. The selector control processing procedure of the second embodiment is different from the selector control processing procedure of the first embodiment only in the following two points. The first point is that, in the selector control processing procedure of the second embodiment, step S110 and step S111 are omitted from the selector control processing procedure of the first embodiment. The second point is that the process directly proceeds to step S112 when the result of step S109 is No.

Figure 12:
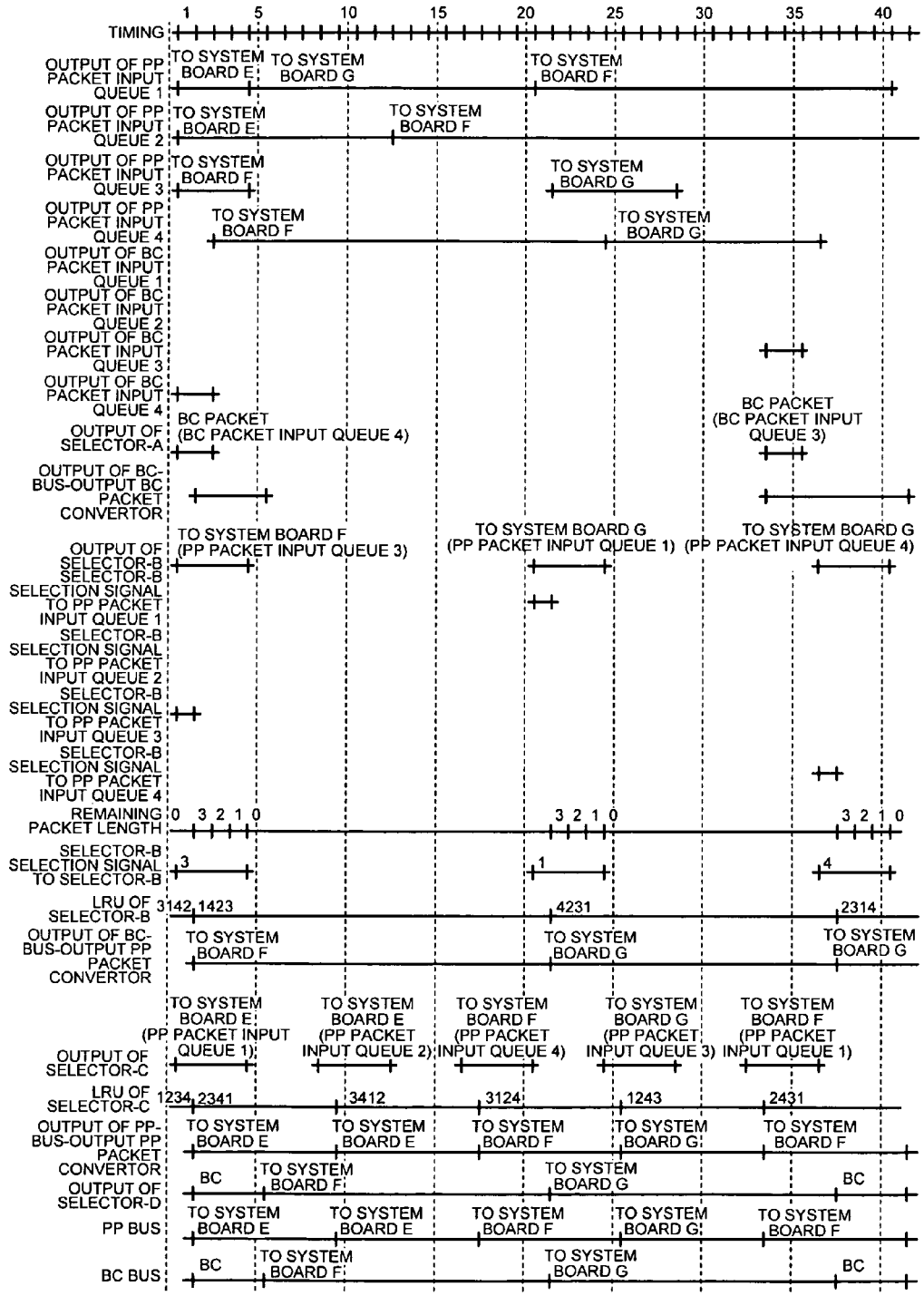
FIG. 12 is a timing chart of processing in a selector control unit of the second embodiment.

FIG. 12 is a timing chart of the processing in the selector control unit of the second embodiment. The bus width ratio of the BC bus 101 to the PP bus 102, the bus clock frequency ratio of the BC bus 101 to the PP bus 102, and the bus clock frequency ratio of the BC bus 101 and the PP bus 102 to the internal bus are the same as those of the first embodiment. Also, the packet length of the BC packet and the packet length of the PP packet are the same as those of the first embodiment.

Since the priority control unit 179b-2 according to the second embodiment does not perform the exclusive control in which the PP packet that is output from the selector-C 159 and output to the PP bus 102 is not redundantly output from the selector-B 158 and output to the BC bus 101, the output sequences of the packets output from the BC bus 101 and the PP bus 102 are different between the timing chart of processing in the selector control unit of the second embodiment and the timing chart of processing in the selector control unit of the first embodiment.

Specifically, even when the output timings of the PP packet from each PP packet input queue are the same as those of the first embodiment, in a period from the timing 6 to the timing 21, while the PP packet whose TID indicates the system board F is being output from the BC bus 101, in a period from the timing 18 to the timing 25, the PP packet whose TID also indicates the system board F is output from the PP bus 102.

In addition, in a period from the timing 22 to the timing 37, even while the PP packet whose TID indicates the system board G is being output from the BC bus 101, in a period from the timing 26 to the timing 34, the PP packet whose TID also indicates the system board G is output from the PP bus 102. Therefore, the output sequences of the packets output from the BC bus 101 and the PP bus 102 are different from the timing chart of processing in the selector control unit of the first embodiment.

According to the example of the second embodiment described above, in an information processing device such as a parallel computer in which a plurality of cross bar boards to which a plurality of system boards are connected are connected to each other via the BC bus and the PP bus, the exclusive control in which a PP packet having the same TID as the TID of a PP packet transmitted to another cross bar board via the PP bus is not output from the BC bus is not performed, so that the load of selection and determination processing to select a PP packet that is output from the BC bus is lightened.

[c] Third Embodiment

Figure 13:
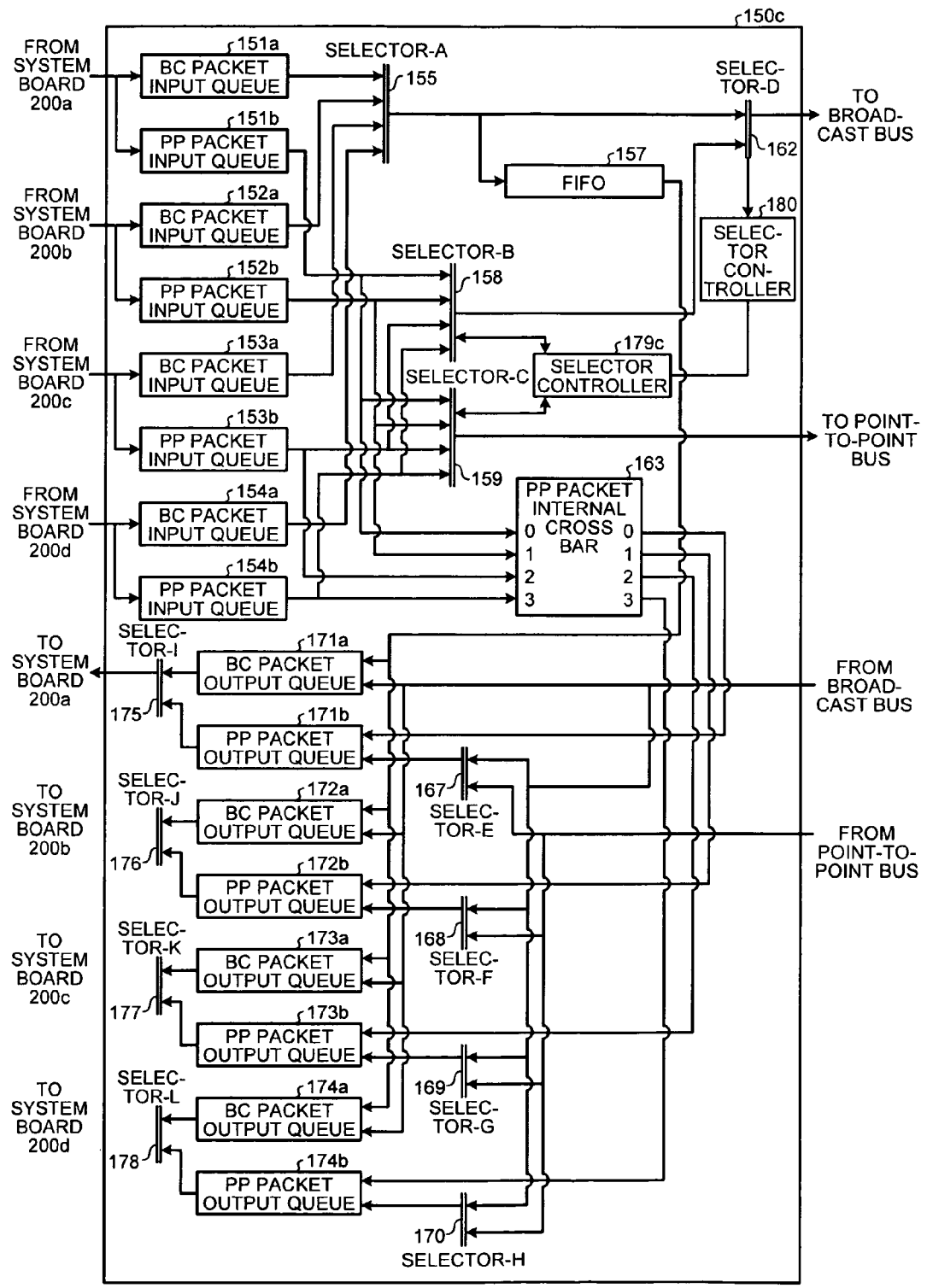
FIG. 13 is a functional block diagram depicting a configuration of a selector controller according to an example of a third embodiment.
Figure 14:
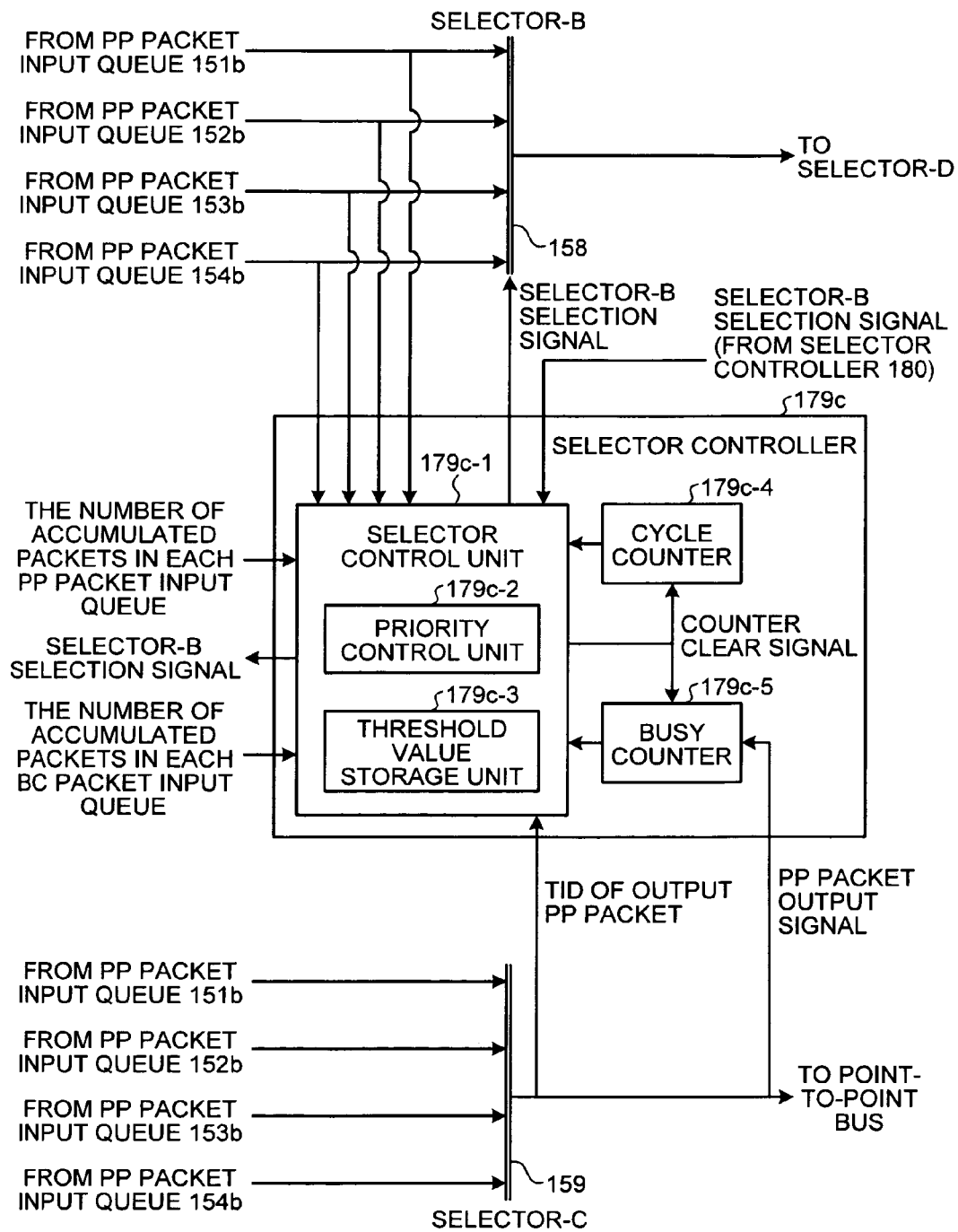
FIG. 14 is a functional block diagram depicting a configuration of a selector controller according to the example of the third embodiment.

Next, an example of a third embodiment will be described with reference to FIGS. 13 to 15. In the description of the example of the third embodiment, only a difference between the first embodiment and the third embodiment will be described. FIG. 13 is a functional block diagram depicting a configuration of a cross bar board 150c according to the example of the third embodiment. As illustrated in FIG. 13, different from the cross bar board 150a according to the example of the first embodiment, the cross bar board 150c according to the example of the third embodiment does not include the BC-bus-output BC packet convertor 156, the BC-bus-output PP packet convertor 160, the PP-bus-output PP packet convertor 161, the BC-bus-input BC packet convertor 164, the BC-bus-input PP packet convertor 165, and the PP-bus-input PP packet convertor 166.

This is because the bus width of the BC bus 101 and the bus width of the PP bus 102 are the same, the clock frequencies of the BC bus 101, the PP bus 102, and the internal bus of the cross bar board 150a are the same. The packet length of the BC packet and the packet length of the PP packet are the same as those of the first embodiment.

The cross bar board 150c according to the example of the third embodiment includes a selector controller 179c instead of the selector controller 179a. A configuration of the selector controller 179c will be described below with reference to FIG. 14. A PP packet output from the selector-B 158 by control of the selector controller 179c is directly input to the selector-D 162. A PP packet output from the selector-C 159 by control of the selector controller 179c is output to the PP bus 102.

The cross bar board 150c according to the example of the third embodiment further includes a selector controller 180 that controls the selector-D 162. The selector controller 179c receives a selector-B selection signal indicating that the PP packet from the selector-B 158 is selected and output by the selector-D 162 from the selector controller 180.

The BC packet from the BC bus 101 is directly input into each BC packet output queue and, the PP packet from the BC bus 101 is directly input into one of the selector-E 167, the selector-F 168, the selector-G 169, and the selector-H 170 depending on the TID. The PP packet from the PP bus 102 is also directly input into one of the selector-E 167, the selector-F 168, the selector-G 169, and the selector-H 170 depending on the TID.

Next, a configuration of the selector controller according to the example of the third embodiment will be described. FIG. 14 is a functional block diagram depicting the configuration of the selector controller according to the example of the third embodiment. As illustrated in FIG. 14, the selector controller 179c according to the example of the third embodiment includes a selector control unit 179c-1, a cycle counter 179c-4, and a busy counter 179c-5. The cycle counter 179c-4 and the busy counter 179c-5 are respectively the same as the cycle counter 179a-4 and the busy counter 179a-5 according to the example of the first embodiment.

The selector control unit 179c-1 is a control device such as a microcomputer that performs an overall control of the selector controller 179c, and further includes a priority control unit 179c-2 and a threshold value storage unit 179c-3. The threshold value storage unit 179c-3 is the same as the threshold value storage unit 179a-3 according to the example of the first embodiment.

The priority control unit 179c-2 determines whether the priority control unit 179c-2 inputs the PP packet from one of the PP packet input queues 151b, 152b, 153b, and 154b into the selector-B 158 on the basis of the number of accumulated BC packets in each BC packet input queue, the number of accumulated PP packets in each PP packet input queue, the PP bus usage rate, the TID of the PP packet output from the selector-C 159, and the selector-B selection signal from the selector controller 180.

However, the condition to determine whether the priority control unit 179c-2 can transmit the PP packet via the BC bus 101 is relaxed compared with the example of the first embodiment. Specifically, when only Condition 1 to Condition 3 and Condition 5 are satisfied, it is determined that the priority control unit 179c-2 can transmit the PP packet via the BC bus 101 without Condition 4 being satisfied.

Therefore, the selector controller 179c need not check the TIDs of BC packets accumulated in the BC-bus-output PP packet convertor 160 and the TIDs of PP packets accumulated in the PP-bus-output PP packet convertor 161, so that the processing load is lightened compared with the selector controller 179a according to the first embodiment.

Even when the bus width of the BC bus 101 and the PP bus 102 between the cross bar boards and the bus width of the bus between the system board and the cross bar board are the same and the clock frequency of the BC bus 101 and the PP bus 102 is slower than the clock frequency inside the cross bar, by adjusting the speed at which the BC packet and the PP packet pass through the selector-A 155 and the selector-C 159, it is possible to operate in almost the same manner as when the bus widths of the BC bus 101 and the PP bus 102 are the same and the clock frequencies of the BC bus 101 and the PP bus 102 are the same.

Figure 15:
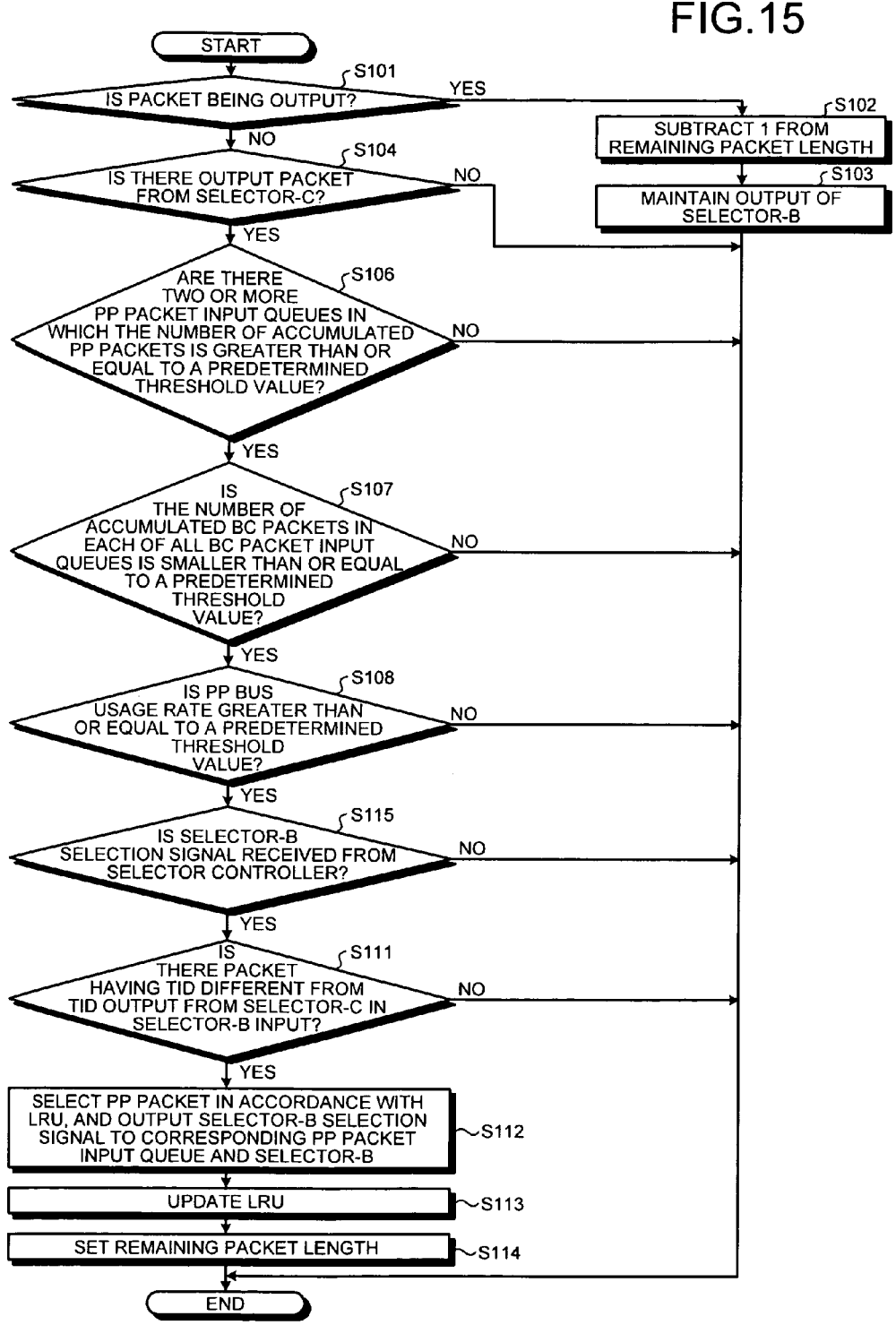
FIG. 15 is a flowchart depicting a selector control processing procedure of the third embodiment.

FIG. 15 is a flowchart depicting a selector control processing procedure of the third embodiment. The selector control processing procedure of the third embodiment is different from the selector control processing procedure of the first embodiment in the following point: Step S105, step S109, and step S110 are omitted from the selector control processing procedure of the first embodiment and step S115 is inserted between step S108 and step S111.

Specifically, when the result of step S104 is No, the selector control processing ends. In step S115, the priority control unit 179c-2 determines whether the selector-B selection signal is received from the selector controller 180. If it is determined that the selector-B selection signal is received from the selector controller 180 (step S115: Yes), the process proceeds to step S111, and if it is not determined that the selector-B selection signal is received from the selector controller 180 (step S115: No), the selector control processing ends.

Figure 16:
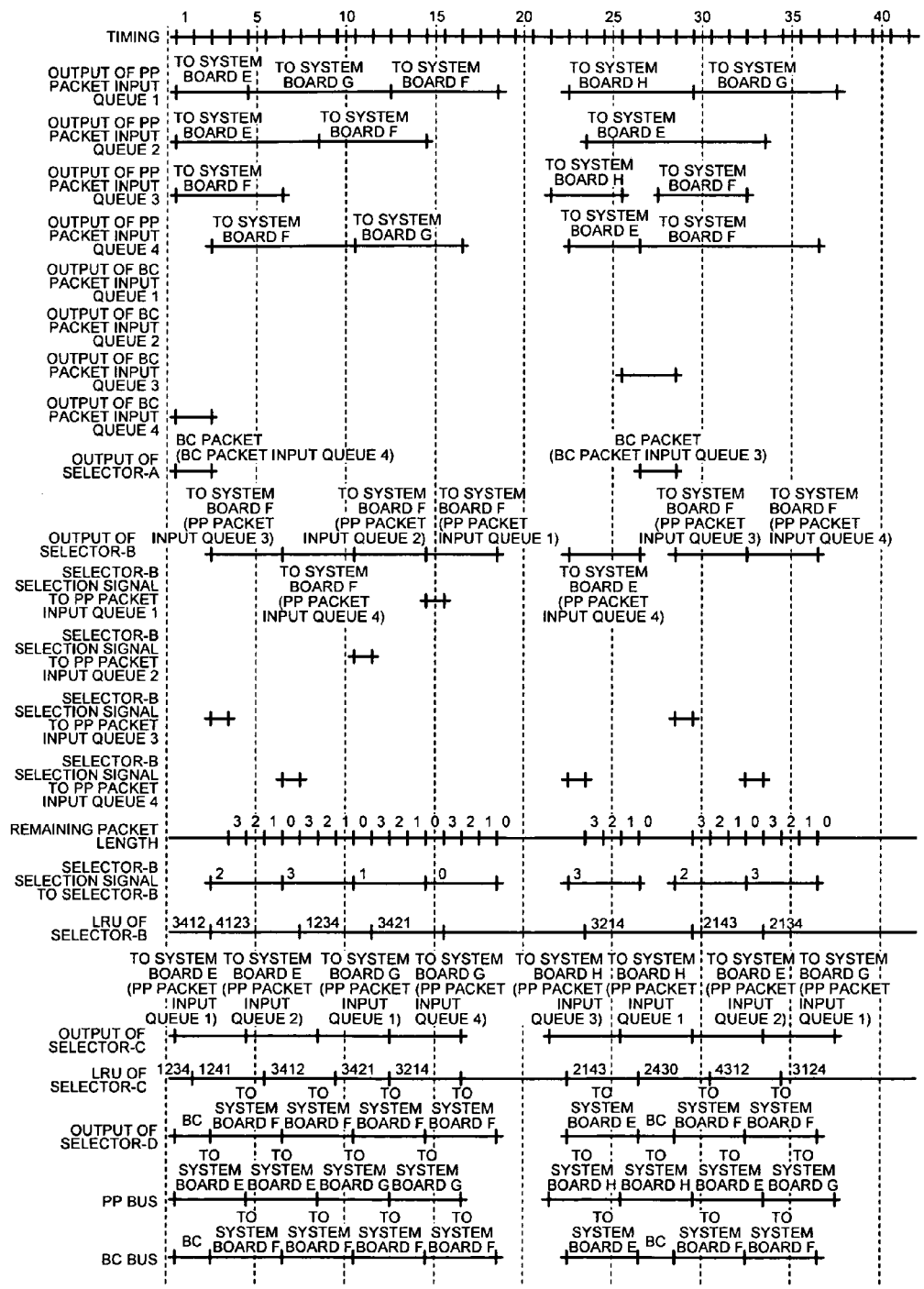
FIG. 16 is a timing chart of processing in a selector control unit of the third embodiment.

FIG. 16 is a timing chart of the processing in the selector control unit of the third embodiment. The bus widths of the BC bus 101 and the PP bus 102 are the same, and the bus clock frequencies of the BC bus 101 and the PP bus 102 are the same. The packet length of the BC packet and the packet length of the PP packet are the same as those of the first embodiment.

The timing chart of processing in the selector control unit of the third embodiment is different from the timing chart of processing in the selector control unit of the first embodiment in the following point: Since there is no time loss of format conversion by the BC-bus-output PP packet convertor 160, the priority control unit 179c-2 can continuously select the PP packet input queues in accordance with the LRU to output the PP packet by outputting the selector-B selection signal to the selected PP packet input queue.

However, when the priority control unit 179c-2 selects a PP packet input queue, the priority control unit 179c-2 performs exclusive control so that the priority control unit 179c-2 does not select a PP packet having the same TID as the TID of the PP packet output by the selector-C 159.

In this way, for example, in the periods from the timing 3 to the timing 6, from the timing 7 to the timing 10, from the timing 11 to the timing 14, and from the timing 15 to the timing 18, while avoiding overlapping of the TID with the PP packet output to the PP bus, as long as there is no BC packet to be output, it is possible to continuously output PP packets to the BC bus, and hence, PP packets are output more quickly and efficiently to the BC bus 101.

According to the example of the third embodiment described above, in an information processing device such as a parallel computer in which a plurality of cross bar boards to which a plurality of system boards are connected are connected to each other via the BC bus and the PP bus, on condition that the bus width of the BC bus and the bus width of the PP bus are the same and the clock frequency of the BC bus and the PP bus and the clock frequency of the internal bus of the cross bar board 150a are the same, the BC-bus-output BC packet convertor, the BC-bus-output PP packet convertor, the PP-bus-output PP packet convertor, the BC-bus-input BC packet convertor, the BC-bus-input PP packet convertor, and the PP-bus-input PP packet convertor can be omitted, so that the cross bar board can be simply configured at low cost.

On condition that the bus clock frequency of the BC bus and the PP bus and the clock frequency of the internal bus of the cross bar board 150a are the same, there is no time loss of the packet format conversion performed by the BC-bus-output BC packet convertor, the BC-bus-output PP packet convertor, the PP-bus-output PP packet convertor, the BC-bus-input BC packet convertor, the BC-bus-input PP packet convertor, and the PP-bus-input PP packet convertor, and thus the BC packets and the PC packets can be output quickly from each bus. Since, generally, the BC bus has a narrower bus width and a lower clock frequency compared with the PP bus, in particular, when outputting the PP packets by using the BC bus, the PC packets can be output quickly from the BC bus, so that it is possible to increase the use efficiency of the BC bus.

Although the examples of the embodiments of the invention have been described, the invention is not limited to these, and various different embodiments may be implemented within the technical idea described in the claims. The effects described in the examples of the embodiments are not limited to these.

In each processing described in the examples of the above embodiments, all or part of the processing described to be automatically performed can be performed manually, or all or part of the processing described to be manually performed can be performed automatically by a publicly known method. Moreover, the processing procedures, control procedures, specific names, and information including various data and parameters described in the above embodiments can be arbitrarily changed unless otherwise stated.

The constituent elements of the devices illustrated in the drawings are functionally conceptual, and need not necessarily be physically configured as illustrated. In other words, specific forms of distribution and integration of the devices are not limited to those illustrated in the drawings, and all or part of the devices can be functionally or physically distributed or integrated in arbitrary units according to various loads and the state of use.

According to an aspect of an embodiment of the present invention, both of the two types of buses can be used to transmit/receive second data, transmission/reception delay of the second data can be avoided, and use efficiency of the two types of buses can be increased as a whole.

According to another aspect of the present invention, occurrence of output delay of first data from a first bus output unit can be avoided.

According to still another aspect of the present invention, data can be efficiently output even when data widths or data transfer speeds are different between the control circuit and the data transfer circuit.

According to still another aspect of the present invention, the same output delay as the output delay caused by changing data width or data transfer speed of the first data output to another data transfer circuit is provided to the first data output to a first transmission unit, so that the first data can be output to all the data transfer circuits at the same timing regardless of output destination.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a first data transfer circuit;
   a second data transfer circuit, wherein the first data transfer circuit is connected to the second data transfer circuit via a first bus and a second bus; and
   a plurality of control circuits that are connected to the first data transfer circuit or the second data transfer circuit, a control circuit transferring data to another control circuit, wherein the first data transfer circuit includes:
      a first reception unit that receives, from a control circuit connected to the first data transfer circuit, first data to be transmitted to all the control circuits connected to the second data transfer circuit, and queues the received first data;
      a second reception unit that receives, from a control circuit connected to the first data transfer circuit, second data to be transmitted to one of the control circuits connected to the second data transfer circuit, and queues the received second data;
      a first bus output unit that transmits the first data to the second data transfer circuit via a first selection unit and the first bus;
      a second bus output unit that transmits the second data to the second data transfer circuit via the second bus;
      a selector control unit that controls a second selection unit to allow the second data to be transmitted to the second data transfer circuit via a third bus output unit, the first selection unit and the first bus, based on a usage rate of the second bus and an amount of the first data queued in the first reception unit;
      a first bus input unit that receives third data to be transmitted to all the control circuits connected to the first data transfer circuit or forth data to be transmitted to one of the control circuits connected to the first data transfer circuit from a control circuit connected to the second data transfer circuit via the first bus; and
      a second bus input unit that receives the fourth data via the second bus.

2. The information processing device according to claim 1, wherein the first selection unit selects the first data in preference to the second data, and outputs the selected data to the second data transfer circuit.

3. The information processing device according to claim 1, wherein
   when the first, second and third bus output units output the first or second data received from a control circuit connected to the first data transfer circuit to the second data transfer circuit, the first, second and third bus output units change the data width or the data transfer speed before outputting the data.

4. The information processing device according to claim 1, wherein the first data transfer circuit further includes a FIFO unit that holds data received via the first reception unit from a control circuit connected to the first data transfer circuit, the data being to be transmitted to all the control circuits connected to the first data transfer circuit, and outputs the held data at a same time as when the first bus output unit transmits the first data to the second data transfer circuit.

5. A data transfer circuit, wherein the data transfer circuit is connected to another data transfer circuit via a first bus and a second bus, and a plurality of control circuits are connected to the data transfer circuit or the another data transfer circuit, a control circuit transferring data to another control circuit, the data transfer circuit comprising:
   a first reception unit that receives, from a control circuit connected to the data transfer circuit, first data to be transmitted to all the control circuits connected to the another data transfer circuit, and queues the received first data;
   a second reception unit that receives, from a control circuit connected to the data transfer circuit, second data to be transmitted to one of the control circuits connected to the another data transfer circuit, and queues the received second data;
   a first bus output unit that transmits the first data to the another data transfer circuit via a first selection unit and the first bus;
   a second bus output unit that transmits the second data to the another data transfer circuit via the second bus;
   a selector control unit that controls a second selection unit to allow the second data to be transmitted to the another data transfer circuit via a third bus output unit, the first selection unit and the first bus, based on a usage rate of the second bus and an amount of the first data queued in the first reception unit;
   a first bus input unit that receives third data to be transmitted to all the control circuits connected to the data transfer circuit or forth data to be transmitted to one of the control circuits connected to the data transfer circuit from a control circuit connected to the another data transfer circuit via the first bus; and
   a second bus input unit that receives the fourth data via the second bus.

6. A control method, wherein a first data transfer circuit is connected to a second data transfer circuit via a first bus and a second bus, and a plurality of control circuits are connected to the first data transfer circuit or the second data transfer circuit, a control circuit transferring data to another control circuit, the control method comprising:
   receiving, in a first reception unit, from a control circuit connected to the first data transfer circuit, first data to be transmitted to all the control circuits connected to the second data transfer circuit, and queuing the received first data;

receiving, in a second reception unit, from a control circuit connected to the first data transfer circuit, second data to be transmitted to one of the control circuits connected to the second data transfer circuit, and queuing the received second data;

transmitting, in a first bus output unit, the first data to the second data transfer circuit via a first selection unit and the first bus;

transmitting, in a second bus output unit, the second data to the second data transfer circuit via the second bus;

controlling, in a selector control unit, a second selection unit to allow the second data to be transmitted to the second data transfer circuit via a third bus output unit, the first selection unit and the first bus, based on a usage rate of the second bus and an amount of the first data queued in the first reception unit;

receiving, in a first bus input unit, third data to be transmitted to all the control circuits connected to the first data transfer circuit or forth data to be transmitted to one of the control circuits connected to the first data transfer circuit from a control circuit connected to the second data transfer circuit via the first bus; and receiving, in a second bus input unit, the fourth data via the second bus.

* * * * *